United States Patent
Leimbach et al.

(10) Patent No.: US 7,819,260 B2
(45) Date of Patent: Oct. 26, 2010

(54) TIRE RACK, LOADING AND UNLOADING SYSTEMS AND METHODS

(75) Inventors: Wendell B. Leimbach, Baltimore, MD (US); James Wheeler Marshal, Shrewsbury, PA (US); Rick Wallace, Perry Hall, MD (US)

(73) Assignee: Linwell, Inc., Baltimore, MD (US)

( * ) Notice: Subject to any disclaimer, the term of this patent is extended or adjusted under 35 U.S.C. 154(b) by 1013 days.

(21) Appl. No.: 11/161,661

(22) Filed: Aug. 11, 2005

(65) Prior Publication Data
US 2006/0088405 A1       Apr. 27, 2006

Related U.S. Application Data

(60) Provisional application No. 60/600,716, filed on Aug. 11, 2004, provisional application No. 60/633,216, filed on Dec. 4, 2004.

(51) Int. Cl.
*A47F 7/04* (2006.01)
(52) U.S. Cl. ......................................................... 211/24
(58) Field of Classification Search .................. 211/24, 211/187, 188, 194, 59.4, 85.18, 126.2; 206/304
See application file for complete search history.

(56) References Cited

U.S. PATENT DOCUMENTS

| | | | | |
|---|---|---|---|---|
| 1,438,729 | A * | 12/1922 | Vance | 211/23 |
| 2,262,794 | A * | 11/1941 | Burbank et al. | 211/85.5 |
| 3,348,698 | A * | 10/1967 | McConnell | 211/24 |
| 3,547,258 | A * | 12/1970 | Black | 206/304 |
| 3,557,966 | A * | 1/1971 | Skubic | 211/24 |
| 3,638,790 | A | 2/1972 | Schmid et al. | |
| 3,822,526 | A | 7/1974 | Black | |
| 3,850,295 | A * | 11/1974 | Black | 206/304 |
| 3,880,291 | A * | 4/1975 | Sylvester | 211/24 |
| 3,978,256 | A | 8/1976 | James | |
| 4,195,732 | A * | 4/1980 | Bell | 206/391 |

(Continued)

FOREIGN PATENT DOCUMENTS

JP         62-32036         2/1987

(Continued)

OTHER PUBLICATIONS

Informational sheet re RMT robotics showing a robotic gantry system.

(Continued)

*Primary Examiner*—Jennifer E. Novosad
(74) *Attorney, Agent, or Firm*—Snell & Wilmer L.L.P.

(57) ABSTRACT

A tire loading apparatus and method of packing tires that includes placing the tires in a rack, compressing the tires, and assembling the rack are disclosed. The apparatus includes one or more conveyors, scanners, and robots that load tires from a conveyor to a rack. A tire unloading apparatus is also disclosed. The unloading apparatus includes a scissor mechanism to raise and/or lower tire racks to an unloading platform. The unloading apparatus additionally includes one or more unloaders and conveyors. The sorting and unloading of tires is accomplished with one or more automated conveyors, scanners, and storage structures for reading information from incoming tires and using the tire information to sort and store the tires. A rack to improve compression and support of tires during storage and shipment is also disclosed.

10 Claims, 20 Drawing Sheets

U.S. PATENT DOCUMENTS

| | | | |
|---|---|---|---|
| 4,397,434 A | | 8/1983 | Farnham |
| 4,491,449 A | | 1/1985 | Hawkins |
| 4,688,684 A | * | 8/1987 | Young et al. ............... 211/59.4 |
| 4,729,709 A | | 3/1988 | Raash |
| 4,735,320 A | * | 4/1988 | Hoss ........................... 206/583 |
| 4,750,623 A | * | 6/1988 | Flum ........................... 211/59.4 |
| 4,773,547 A | | 9/1988 | Bell |
| 4,777,781 A | * | 10/1988 | Doster et al. .................. 53/527 |
| 4,941,798 A | | 7/1990 | Meier |
| 5,064,334 A | | 11/1991 | Cooley |
| 5,201,427 A | * | 4/1993 | Dowty ......................... 211/23 |
| 5,205,221 A | | 4/1993 | Melin et al. |
| 5,265,999 A | | 11/1993 | Wenschhof et al. |
| 5,372,469 A | | 12/1994 | Kobayashi |
| 5,606,921 A | | 3/1997 | Elder et al. |
| 5,681,141 A | | 10/1997 | Critel |
| 5,697,294 A | | 12/1997 | Keller et al. |
| 5,722,544 A | * | 3/1998 | Williams ..................... 211/188 |
| 5,769,003 A | | 6/1998 | Rose et al. |
| 5,816,142 A | * | 10/1998 | Keller et al. .................. 100/35 |
| 5,887,718 A | * | 3/1999 | Oslin et al. .................. 206/499 |
| 5,888,612 A | | 3/1999 | Needham et al. |
| 5,894,044 A | | 4/1999 | Norcom et al. |
| 5,960,720 A | | 10/1999 | Borland et al. |
| 6,135,297 A | * | 10/2000 | DeShazo et al. ............... 211/74 |
| 6,290,074 B1 | * | 9/2001 | Syvuk et al. ................... 211/74 |
| 6,298,999 B1 | * | 10/2001 | Bellman ........................ 211/24 |
| 6,484,877 B1 | * | 11/2002 | Murakami et al. ........... 206/303 |
| 6,527,499 B2 | * | 3/2003 | Leimbach et al. ............. 414/788 |
| 6,591,991 B2 | * | 7/2003 | Belle ........................... 211/24 |
| 6,971,518 B1 | * | 12/2005 | Lowry ........................ 206/386 |
| 6,997,331 B2 | * | 2/2006 | Lobe .......................... 211/59.4 |
| 7,137,517 B2 | * | 11/2006 | Lowry et al. ................. 211/188 |
| 2001/0028838 A1 | * | 10/2001 | Leimbach et al. ........... 414/788 |
| 2002/0088766 A1 | * | 7/2002 | Flores ......................... 211/194 |
| 2005/0269229 A1 | * | 12/2005 | Lowry ........................ 206/386 |
| 2006/0283824 A1 | * | 12/2006 | Farley ........................ 211/188 |
| 2007/0095775 A1 | * | 5/2007 | Beck .......................... 211/194 |
| 2007/0278171 A1 | * | 12/2007 | Jersey et al. ................. 211/188 |
| 2009/0143897 A1 | | 6/2009 | Leimbach |
| 2009/0148260 A1 | | 6/2009 | Leimbach |

FOREIGN PATENT DOCUMENTS

| | | |
|---|---|---|
| JP | 4-12902 | 1/1992 |
| JP | 4-323114 | 11/1992 |
| WO | WO0156886 | 8/2001 |

OTHER PUBLICATIONS

Non-Final Office Action issued Feb. 19, 2002 in U.S. Appl. No. 09/775,910.
Final Office Action issued Jul. 8, 2002 in U.S. Appl. No. 09/775,910.
Advisory Action issued Sep. 19, 2002 in U.S. Appl. No. 09/775,910.
Notice of Allowance and Fee issued Oct. 16, 2002 in U.S. Appl. No. 09/775,910.
PCT Non-Final Office Action issued Feb. 10, 2005 in PCT/US01/03656.
PCT Non-Final Office Action issued Dec. 13, 2005 in PCT/US01/03656.

* cited by examiner

TIRE RACK, LOADING AND UNLOADING SYSTEMS AND METHODS

CROSS-REFERENCE TO RELATED APPLICATIONS

"This application claims priority to, and the benefit of, U.S. Provisional Patent Application No. 60/600,716 entitled "IMPROVED TIRE LOADING SYSTEM AND METHOD" filed Aug. 11, 2004, and U.S. Provisional Patent Application No. 60/633,216 entitled "IMPROVED TIRE RACK, UNLOADING SYSTEM, SORTING SYSTEM AND METHODS" filed Dec. 4, 2004, both of which are incorporated herein by reference in their entirety.

FIELD OF INVENTION

The present invention generally relates to loading and unloading of tires, and more particularly, to a system and method for automatically loading and unloading vehicle tires and compressing vehicle tires for storage and/or transportation within a tire transport frame using a rack system.

BACKGROUND OF INVENTION

The tire distribution process often includes transporting large quantities of tires from the plants where they are manufactured to the various facilities where tires are delivered to consumers and/or mounted on vehicles. The processes for transporting tires from these plants to wholesalers, retailers, and service centers typically involve the use of large vessels. For example, semi-trailers are used for transportation over the road, rail cars are used for transportation via rail, and shipping containers are used for transportation over water. Further, these vessels often provide storage of tires prior to and after transport.

To minimize the costs associated with such storage and transportation, it is desirable to pack tires into each storage and/or transportation vessel in such a manner as to maximize the density of tires within the vessel, while providing satisfactory stability of the loaded tires and avoiding permanent deformation of the loaded tires. Maintenance of tires under a compressive load has been found to improve the stability of the loaded tires. However, compression may lead to permanent deformation of tires in some stacking configurations.

In current operations, some companies use a contracted ricking service to manually load and unload trailers and railcars. Several manufacturers do not compress tires, but other manufacturers compress the tires with a forklift. The ricking service is a substantial labor expense at both the plant and the distribution center, while using a forklift to compress tires often results in inconsistent compression and tire damage.

To partially remedy these problems, devices have been developed to help in the compression of the tire stacks. These systems, however, continue to rely heavily upon manual labor to accomplish the stacking of tires. For example, U.S. Pat. No. 5,697,294 discloses an exemplary tire compression device and U.S. Pat. No. 5,816,142 discloses another tire compression device intended for use with a forklift. This device allows a preset load to compress a stack of tires as the stack is loaded into a truck trailer. Initially, the forklift elevates and supports the preset load. Then, once tires are stacked beneath the elevated load, the forklift allows the load to be lowered against a stack of tires. As a result, the load exerts a downward pressure on the stack of tires, thereby compressing the tires. Once the initial stack is compressed, additional uncompressed tires are loaded on top of the stack until the stack reaches the ceiling of the truck trailer. Then, the forks of the forklift are raised, partially releasing the pressure applied against the compressed portion of the stack and allowing it to expand, while compressing the previously uncompressed portion until the entire stack is equally compressed. This process is repeated, stack by stack, until the entire trailer is full of stacked, compressed tires. Other devices exist that load tires into a truck trailer and similarly compress tires within the trailer. In each of these cases, tires are maintained in compression by the storage and/or transportation vessel itself. However, no assurance exists that the vessel was designed or is suitable to maintain such loads. In fact, vessels are frequently damaged as a result of such use.

When the storage and/or transportation within the vessel is complete, tires are typically manually unloaded from the vessel onto a conveyor or pallet. A variety of implements exist for such handling of tires. For example, U.S. Pat. No. 3,822,526 discloses a device for manipulating tires. However, a device does not exist that sufficiently eliminates the difficulties of manually stacking tires in a storage and/or transportation vessel, and unloading the compressed tires from the same vessel. Moreover, no sufficient device currently exists to eliminate the reliance on the vessel to maintain a compressive load on tires. Although loaders for tires exist, for example, a machine loader and a loader to create a straight stack of tires, the existing loaders are not designed to stack tires in a herringbone pattern. Further still, the current practice is to rest tires directly against the wall and floor of the trailer or boxcar. As a result, the weight of the stacks is unevenly distributed causing further compression and strain on tires. Thus, a lower-compression system for cradling tires during storage and shipping is desired.

A need exists for a system and method for loading tires into a vessel for storage and/or transportation, whereby tires are automatically loaded into a tire transport frame such that the tire transport frame is moved into the vessel by a forklift. A need also exists for a system and method for loading tires into a tire transport frame outside of the vessel for storage and/or transportation, whereby the tire transport frame holds the stacked tires in a compressed state and maintains the stacked tires in proper alignment during shipment and storage. A need also exists for a system and method for loading tires into a vessel for storage and/or transportation such that the loading is automatic, thereby reducing the labor, time, space, risk of injury, and cost required for loading and unloading of tires, while enhancing the safety of the process.

SUMMARY OF INVENTION

The present system and method accomplishes these objectives while overcoming the above described deficiencies in the art. The present invention includes a method of packing tires that includes placing one or more rows of tires against a bottom frame, adding an intermediate frame on top of the one or more rows of tires, compressing the tires, and attaching a vertical member to the intermediate frame. The method additionally includes adding one or more additional rows of tires on top of the intermediate frame, adding a top frame, compressing the one or more additional rows of tires, and attaching a vertical member to the top frame.

The present invention additionally discloses an apparatus for loading a tire onto a rack. The apparatus includes an automated tire conveyor, one or more scanners, and one or more robots to pick the tires off of the conveyor. The present invention additionally includes an apparatus for unloading a rack of tires, which includes a load station configured with a lift. The lift raises a rack of tires to a platform, where an unloader can manually and/or automatically move tires from the rack to a conveyor.

The invention discloses methods and systems for sorting and unloading tires as well. For example, the systems for sorting and unloading tires of the present invention include one or more automated conveyors, scanners, and storage structures. For example, in the sorting system, the scanner can read information off of incoming tires and communicate the tire information to a system of conveyors, which in turn directs each tire to a specific storage structure based upon the tire information (e.g., size, type, etc.). The invention also includes a rack configured with an intermediate frame to improve compression and support of tires during storage and shipment.

BRIEF DESCRIPTION OF THE DRAWINGS

Additional aspects of the present invention will become evident upon reviewing the non-limiting embodiments described in the specification and the claims taken in conjunction with the accompanying figures, wherein like numerals designate like elements, and:

DETAILED DESCRIPTION

It should be appreciated that the particular implementations shown and described herein are illustrative of the invention and its best mode and are not intended to otherwise limit the scope of the present invention in any way. Indeed, for the sake of brevity, trivial and conventional features and aspects of the present invention are not described in extensive detail herein. Furthermore, the connecting lines shown in the various figures shown herein are intended to represent exemplary functional relationships and/or physical couplings between the various elements of the system. It should be noted that many alternative or additional functional relationships or physical connections can be present in a practical tire loading system.

The present invention includes improvements to a rack for transporting tires, improvements to an automatic tire loading system, an automatic tire unloading system, a tire sorting and short-term storage system, improvements to a tire warehousing system, and various methods and components related to such systems. An example of a tire loading system is disclosed in U.S. Pat. No. 6,527,499 (Leimbach, et al.), which is incorporated herein by reference in its entirety. The unloading system and method described herein may include features or steps (which can be in any order) described in U.S. Pat. No. 6,527,499.

Figure 1A:
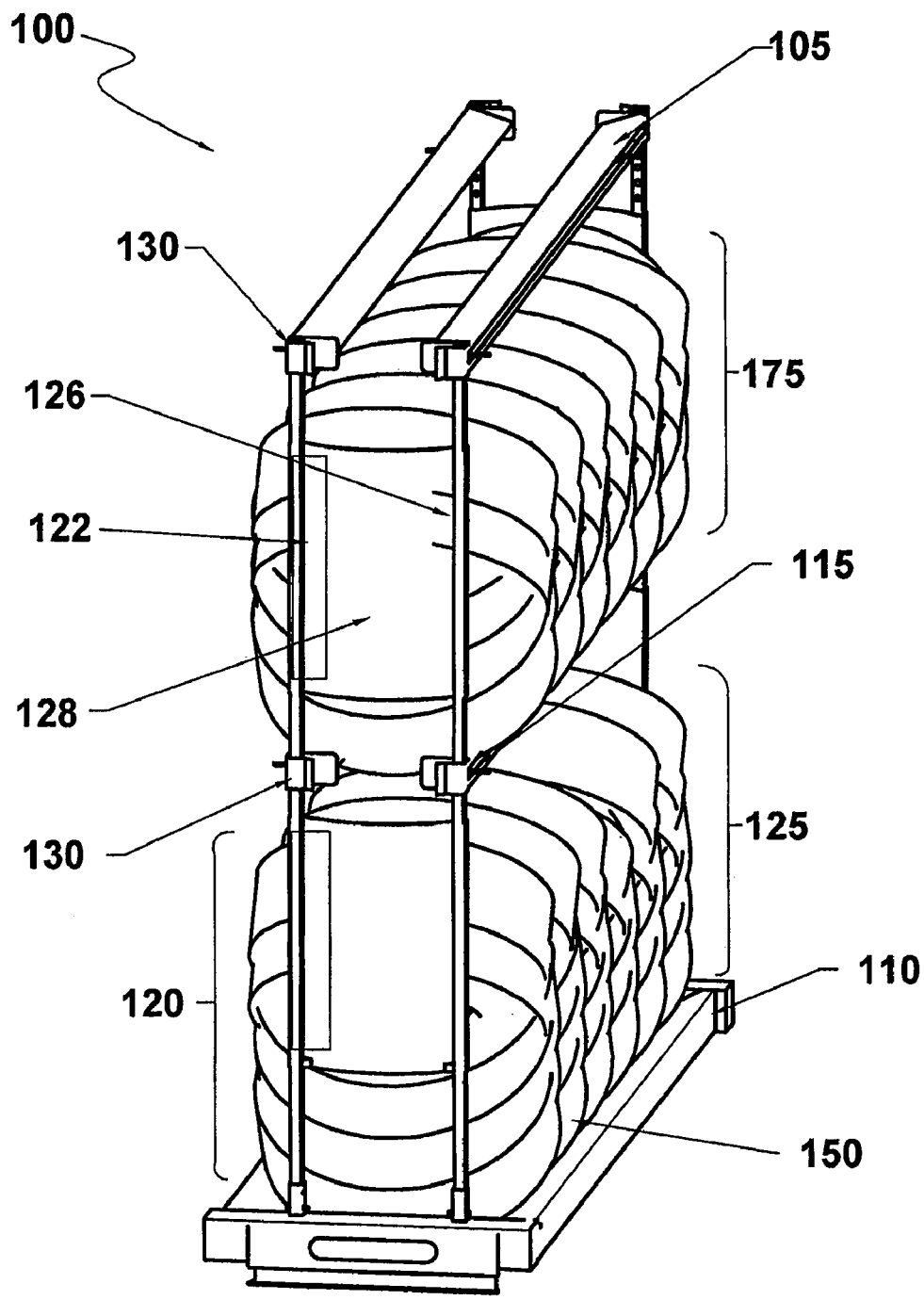
FIGS. 1A-E show an exemplary and improved tire rack in accordance with multiple embodiments of the present invention.

In one exemplary embodiment, and with reference to FIG. 1A, an improved tire rack 100 is provided. Tire rack 100 is used for shipping tires 150 and/or for storing tires 150. Tire rack 100 includes top frame 105; at least one middle, mid-level, or intermediate shelf or frame 115; a bottom frame 110; a plurality of vertical members 120; a plurality of attachment mechanisms 130 configured to attach vertical members 120 to top frame 105; intermediate frame 115 (or frames); and/or bottom frame 110.

Vertical member 120 comprises a top section and a bottom section. In one embodiment, the top section of vertical member 120 is pivotally attached to top frame 105 and bottom frame 110 by attachment mechanisms 130. The top and bottom sections of vertical members 120 are tubular and are configured to fit together concentrically.

Tire rack 100 also includes various features to increase the surface area of contact between rack 100 and tires 150 held by rack 100. Rack 100 is configured of any rigid material such as, for example, wood, steel, aluminum, aluminum alloy, chrome-molybdenum alloy, graphite composite, fiberglass, and/or plastic. Further, the structural design of top frame 105, intermediate frame 115, and/or bottom frame 110 is configured such that the strength to weight ratio is maximized. Therefore, in one embodiment, honeycomb, tubular frame, monocoque, and/or semi-monocoque structures are included over solid structures with similar strength. In one embodiment, top frame 105, intermediate frame 115, and/or bottom frame 110 are constructed as a tubular frame structure bonded with a thin sheet or mesh serving as a web.

In one embodiment, rack 100 holds up to two SKUs (stock control units) of tires 150, thereby offering a more versatile storage and shipping rack. Tire rack 100 includes intermediate frame 115 that separates bottom tires 125 and top tires 175. Intermediate frame 115 is configured to reduce the weight on the bottom tires 125 on rack 100, and thus reduces the risk of damage from the weight of top tires 150, 175. In one embodiment, intermediate frame 115 reduces the weight compression from top tires 175 by about half the weight compression. That is, by supporting half of tires 150, intermediate frame 115 reduces the natural compression effect of tires 150 sitting on top of each other during the shipping and/or storage process.

Attachment mechanisms 130 includes, for example, telescoping tubes, pins, hinges, pivots or the like, which facilitate attaching vertical members 120 to at least one of top frame 105, bottom frame 110, and intermediate frame 115. In one embodiment, four vertical members 120 are attached using mechanisms 130 to top frame 105, bottom frame 110, and/or intermediate frame 115 to form a box construction. In one exemplary embodiment, racks 100 are preconfigured with vertical members 120 and/or shelves 105, 110 and 115 that are collapsible and stackable as described herein. For example, vertical members 120 are attached by a pivot attachment mechanism 130 to facilitate collapsing and/or erecting racks 100 (see, for example, exemplary FIG. 2B). In another exemplary embodiment, an automatic loading system, described herein, automatically places intermediate frame 115 in rack 100 during the loading system.

Tire racks 100 are configured to be stackable, and are stacked when loaded on rail cars, such as box cars, shipping containers, or ships. In some embodiments, racks 100 are stacked on highway trucks, while in other embodiments, just a single layer of racks are set on or in highway trucks.

Figure 1B:
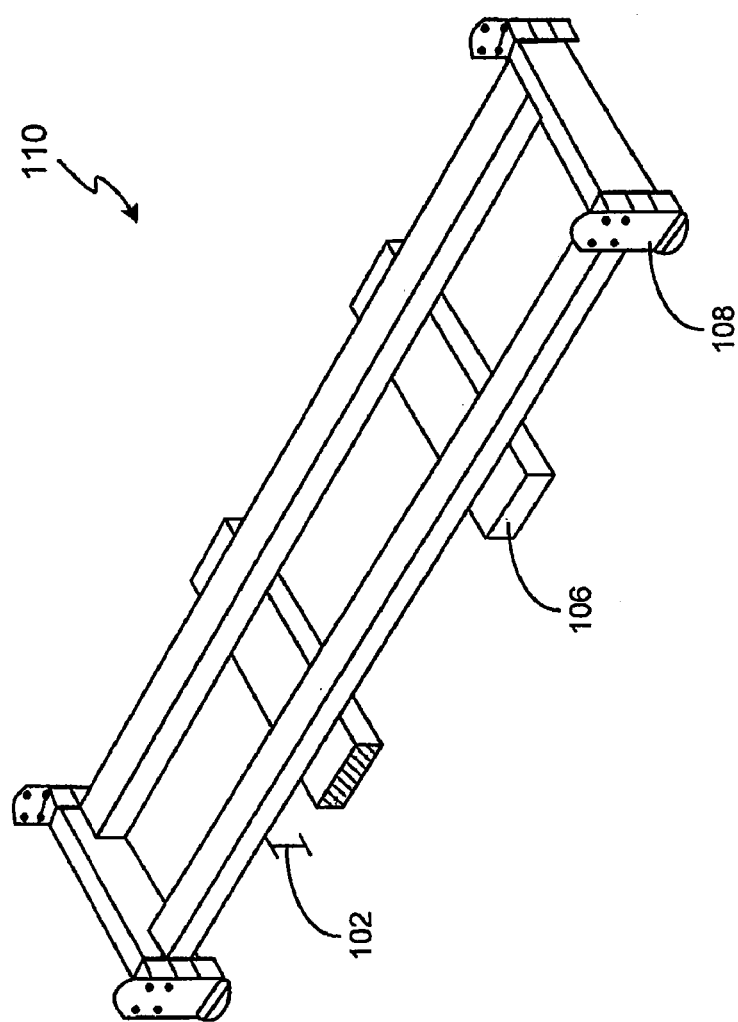
Figure 1C:
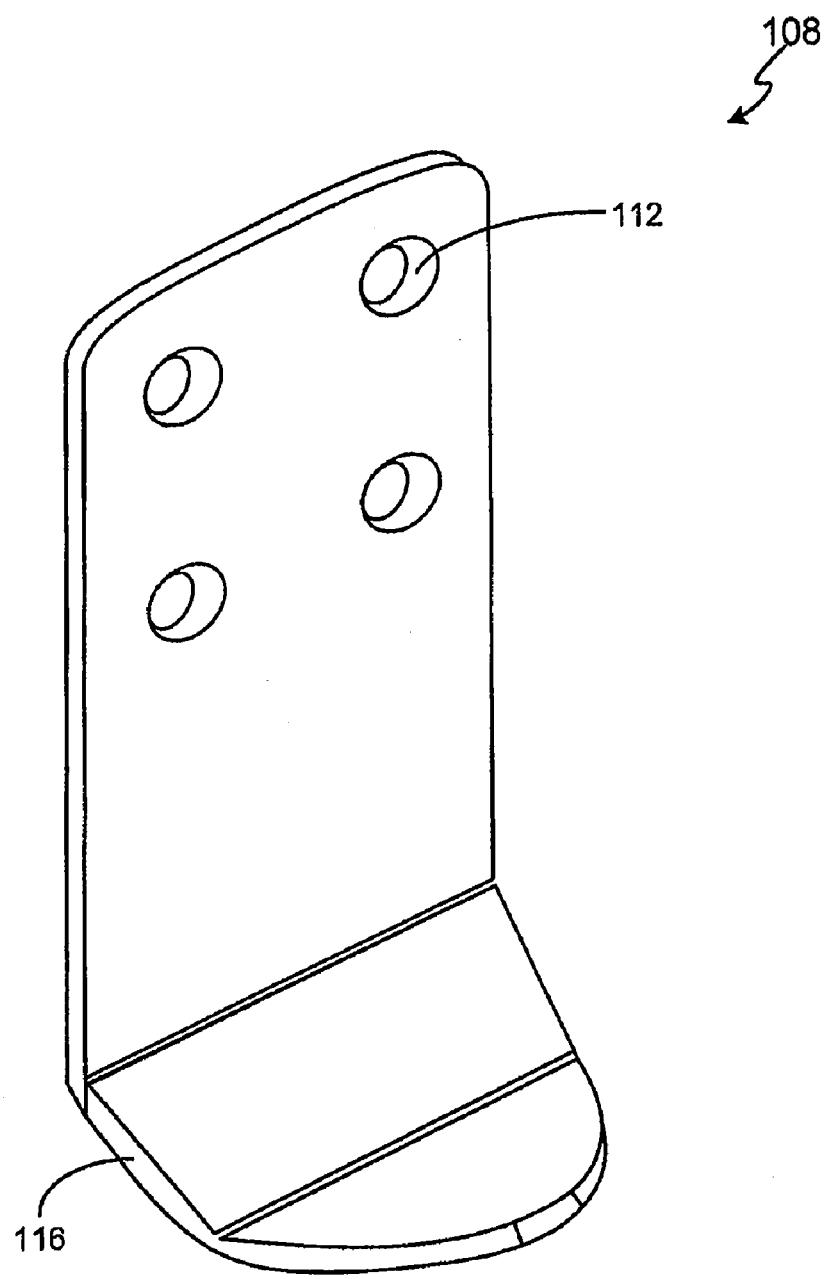

Racks 100 are configured to be lifted and moved with forklifts. For example, in one embodiment depicted in FIG. 1B, bottom shelf 110 includes a raised area 102 or slots 106 to enable a forklift to access under the bottom rack. Bottom shelf 110 is also configured with one or more feet 108 configured to stabilize and/or secure rack 100 to the floor. In one embodiment, bottom shelf 110 is configured with four feet 108, affixed to each corner of shelf 110. Foot 108, as depicted in exemplary FIG. 1C, is configured similar to the rigid material as the rest of rack 100. Foot 108 is configured with one or more holes 112 for receiving attaching mechanisms 130 to facilitate attachment to bottom shelf 110. Foot 108 is configured with one side substantially vertical to shelf 110 and one side substantially planar to the floor. While FIG. 1C illustrates the two sides of foot 108 configured with a 45-degree angle attaching corner 116, foot 108 can also be configured such that the two sides are directly attached at a 90-degree angle.

In some embodiments involving one or more stacked racks 100, bottom and top racks 100 can be identical. In other embodiments, the top rack can be lighter and not as strong (in comparison to bottom frame 110), and/or can have different size vertical member parts 120 attached as described above.

Figure 1D:
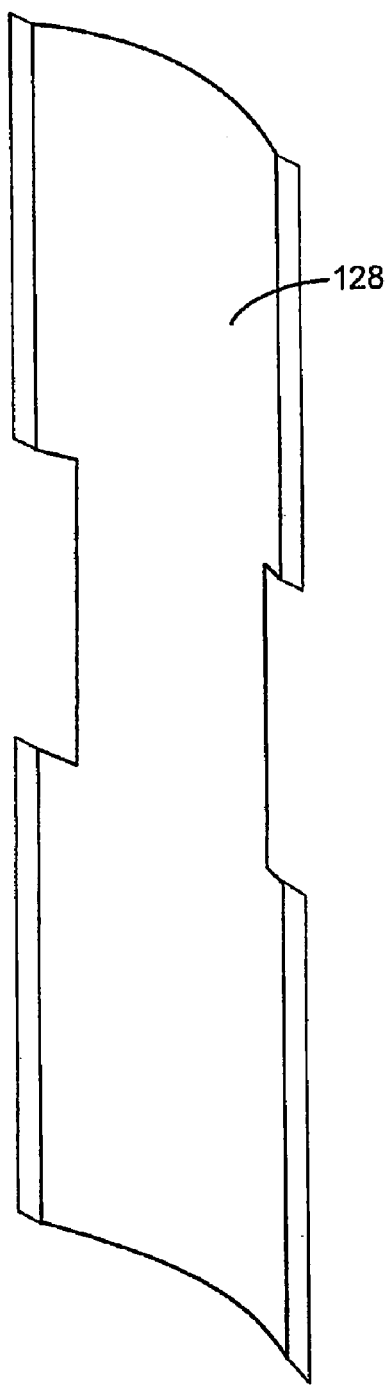
Figure 1E:
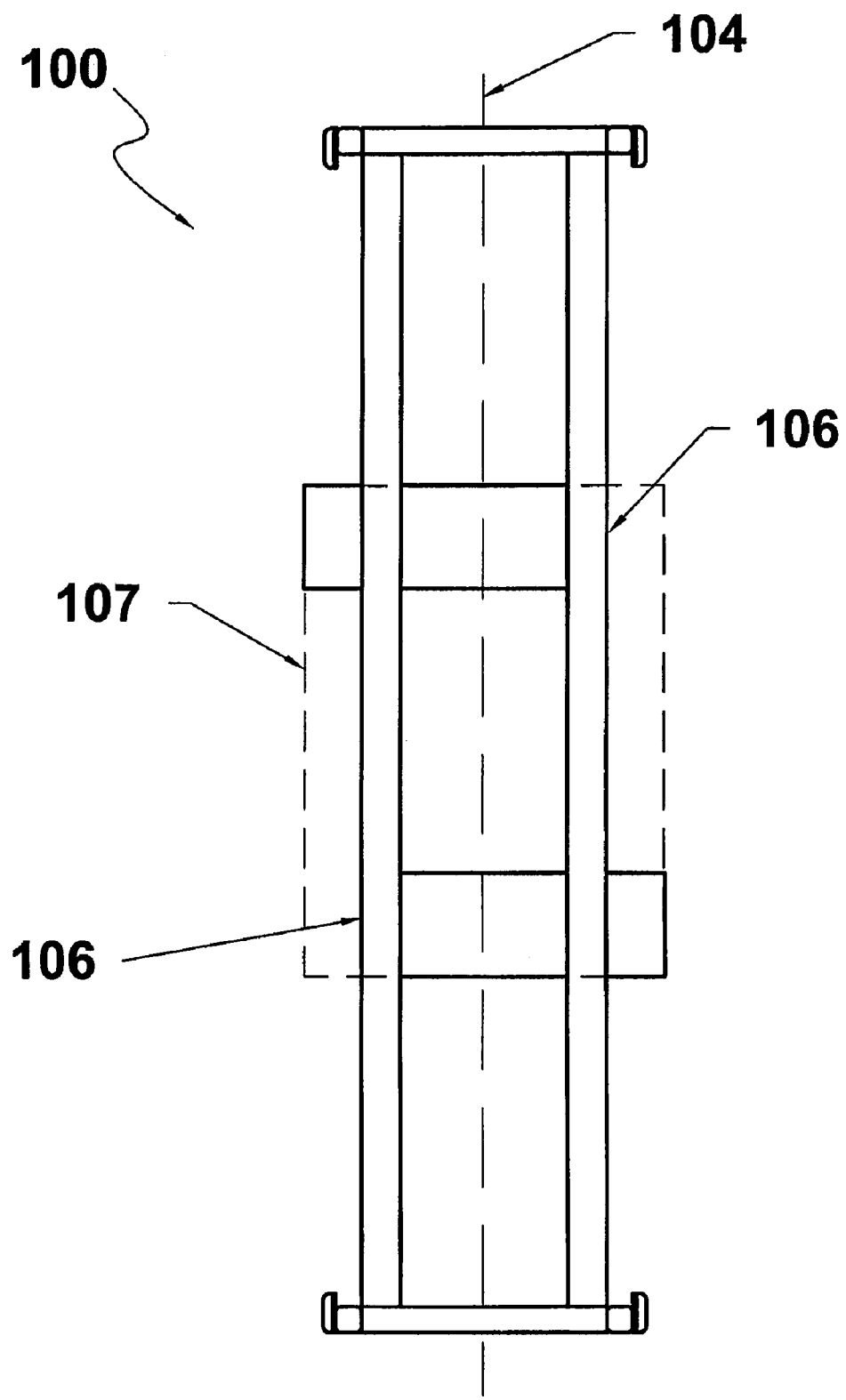

In another embodiment depicted in FIG. 1E, bottom shelf 110 includes one or more slots 106 that are offset to enable more efficient use of space when racks 100 are stacked, while maintaining a large footprint 107. For example, offset slots 106 help accommodate more efficient uses of space when smaller-diameter tires are loaded on racks 100. The offset slot configuration facilitates rack 100 having a larger footprint 107 for stability purposes. For example, in one exemplary embodiment, each slot 106 juts out 14 inches on opposite sides, giving rack 100 a total footprint 107 of 28 inches. Slots 106 are also configured such that the resulting centerlines 104 of each rack 100 are only 24-inches apart from each other.

Figure 2A:
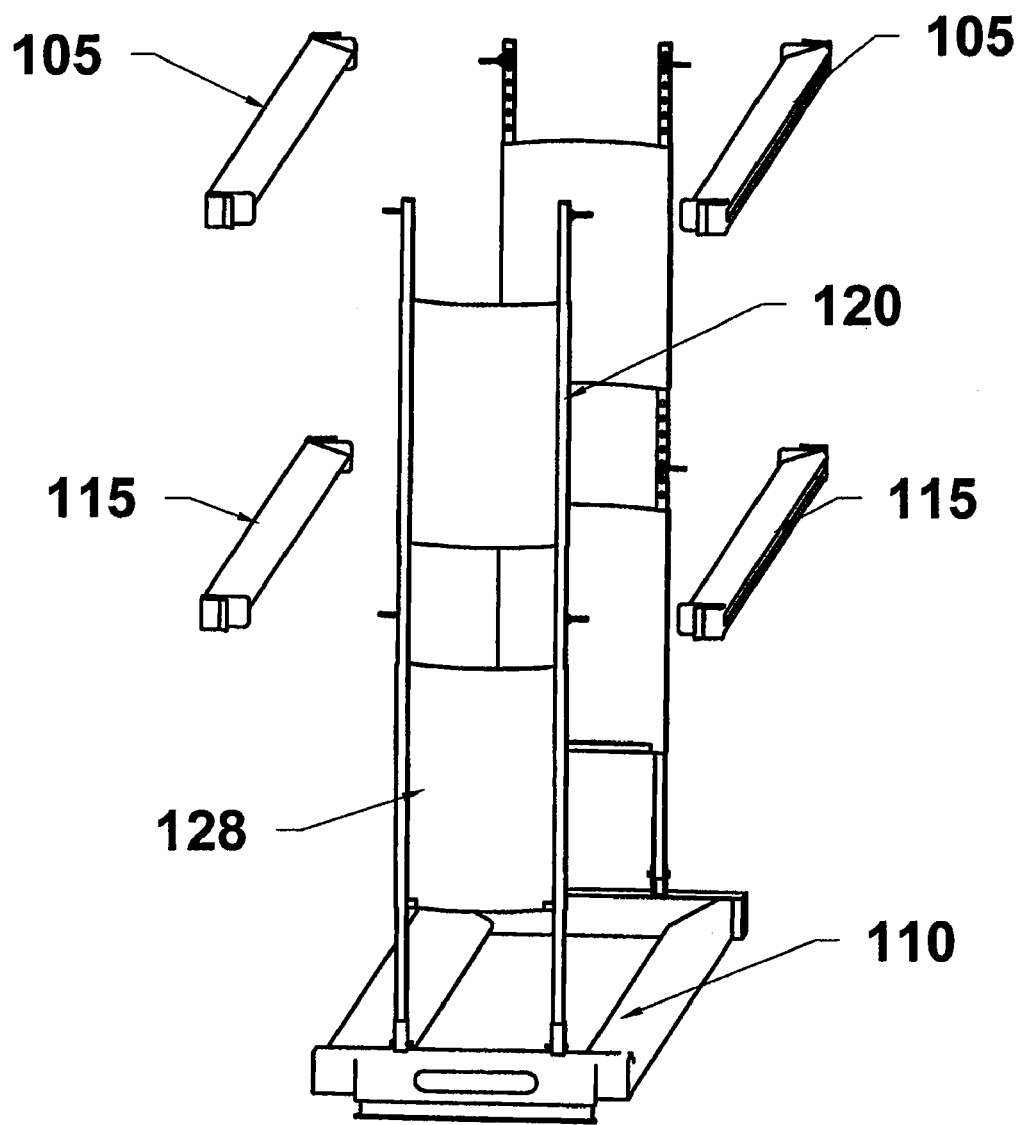
FIGS. 2A-C show an exemplary rack configured to attach closely together for return shipment in accordance with an embodiment of the present invention.
Figure 2B:
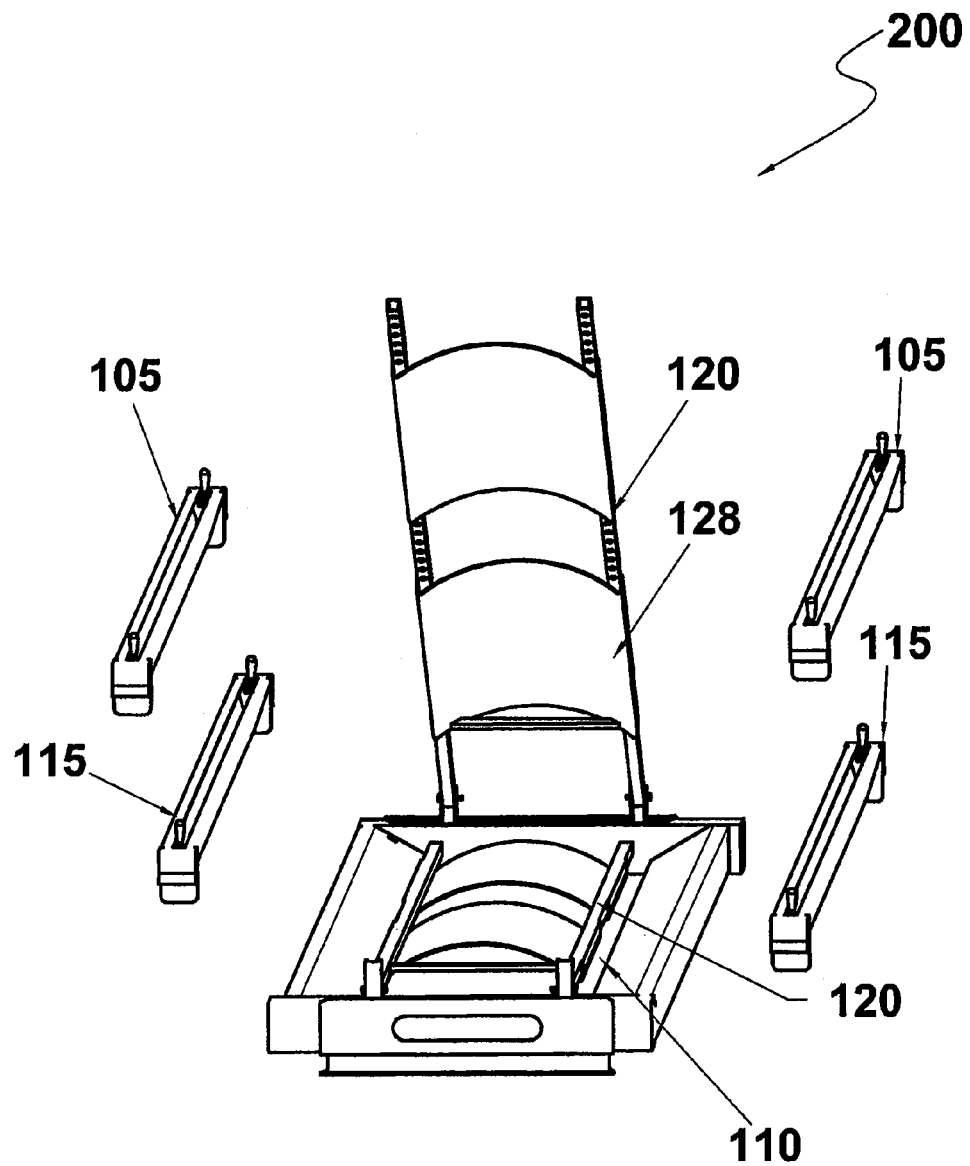

The modular design of rack 100 facilitates making efficient use of space in shipping, the manufacturing plant, and in the distribution center. For example, in one embodiment illustrated in FIGS. 2A-B, bottom frame 110, top frame 105, and/or intermediate frame 115 is configured to attach closely together for return shipment (FIG. 2A-2B). Vertical members 120 fold down, and the horizontal members or frames 105, 110, 115 fit together like a sandwich with vertical members 120 contained in hollow areas between the frames. Intermediate frame 115 is in the middle for return shipment. Top 105, bottom 110, and middle frames 115 are then attached together, which involves attaching or binding them with one or more ropes, straps, chains, ties, fasteners, or banding, as examples. (FIG. 2A-2B). In another embodiment, vertical members 120 are stored between bottom frame 110 and top frame 105, between bottom frame 110 and intermediate frame 115, and/or between top frame 105 and intermediate frame 115. Bottom frame 110, top frame 105, and/or intermediate frame 115 are configured to be similar to each other, upside down from one another, and/or different from one another.

In yet another embodiment, collapsed racks 200 are configured to be easily reconstructed into full-standing racks 100. That is, bottom frame 110, top frame 105, vertical members 120 and/or intermediate frame 115 are configured to be pulled out from collapsed racks 200 and placed into the position of rack 100. Collapsed racks 200 are reconfigured by automated and/or manual means.

In one exemplary embodiment, tire rack 100 is about 6-12" high when disassembled for return shipment, and is stacked in a truck or box car for return shipment. Several racks 100 are tied, strapped, or banded together for return shipment, and are handled as a unit, for example, with a forklift. In another embodiment, about 220 collapsed racks 200 fit in a truck trailer and about 700 fit in a rail boxcar. Further, the ratio for empty trucks carrying collapsed racks 200 to full trucks carrying loaded racks 100 is 10 to 1 (i.e., for every ten trucks that bring loaded racks 100, one truck returns collapsed racks 200). Collapsed racks 200 are fed into a loading system for reuse at the manufacturing plant. In one embodiment, collapsed racks 200 are automatically loaded into conveyor system 400.

In some embodiments, vertical members 120 of tire racks 100 are fabricated in two parts each. For example, a first part of vertical members 120 attaches to and pivots at the top horizontal member 105 or frame, via a hinge, for example. A second part of the vertical member attaches to and pivots at the bottom horizontal member 110 or frame. Vertical members 120 include tubing 126 (e.g., round, square, or rectangular tubing), which is comprised of metal, steel or aluminum. Tubing 126 can be different size diameters on the top and bottom such that the top part fits or slides inside the bottom part or vice versa, in a telescoping arrangement. One or both parts of vertical members 120 fit through intermediate frame 115 or frames 105 and/or 110. The frames attach to vertical members 120 with attachment mechanisms 130 such as pins or hinges, for example. Four vertical members 120 exist in a rack, which intersect with each corner of the frames. Other embodiments have 2, 3, 6, 8, 9, or more vertical members.

Vertical members 120 include external members 122 which slide over tubing 126 described above. External members 122 include at least one cavity therethrough configured such that the tubing can pass through. External members 122 are extruded and comprise any rigid material such as aluminum or plastic. Vertical members 120 or external members have surfaces and/or side panels 128, as illustrated in FIG. 1D, configured and positioned to contact tires 150. Shelves 105, 110, and 115 also have panels 128 configured to contact tires 150. These panels 128 include a radius surface, concave surface or a number of surfaces (e.g., flat surfaces) arranged in a concave pattern. In embodiments of vertical members 120 having external members 122, these panels 128 that contact tires 150 are larger than the surface of tubing 126 described above that contact tires 150 absent external members 122. The concave panels 128 are positioned to contact a convex surface of tires 150, for example, the tread, side wall, or a combination thereof. In another embodiment, rack 100 includes external members 122 or panels 128, such as the exemplary embodiments depicted in FIGS. 1A and 1D.

Panels 128 of rack 100 that contact tires 150 include a radius surface to match or substantially match the curvature of tires 150. Panels 128 of rack 100 that contact tires 150 are configured to increase or maximize the surface area that contacts tires 150, for example, to reduce point loading and/or potential damage to tires 150. Panels 128 of racks 100 that contact tires 150 are configured to minimize the amount that tires 150 are distorted, and/or minimize peak strain or stress in tires 150 caused by distortion from packing. In some embodiments, racks 100 include individual indentations for each tire 150 in bottom frame 110, top frame 105, middle frame 115, and/or vertical members 120, which can help to hold tires 150 in place, increase the surface area of contact between rack 100 and tires 150, and decrease stress or strain in tires 150. Other embodiments do not have such indentations, which can facilitate accommodation of various size tires 150, and/or numbers of tires 150 per row.

For example, in one embodiment, intermediate frame 115 is configured with concave panels 128 to increase the surface area of contact for tires 150. For example, in one embodiment intermediate frame 115 is configured with side panel 126 to support tires 150 along the tread. Intermediate frame 115 is also configured as a plurality of surfaces arranged in a concave pattern. Intermediate frame 115 is configured to reduce the risk of damage to tires 150 from point loading on tires 150. Intermediate frame 115 also allows rack 100 to be shipped partially full of tires 150 (e.g., half full).

Tire racks 100 are configured to transport tires 150 from, for example, a manufacturing plant to a distribution center or warehouse and/or within a manufacturing plant or distribution plant or warehouse, and/or to and from a customer and/or from any location to another location. Tire racks 100 are also configured to be shipped back to the manufacturing plant, distribution plant, warehouse, and/or customer for reuse after tires 150 are unloaded from racks 100. Tire racks 100 are further configured to be loaded via an automated or manual loading system and/or to be unloaded with an automatic or manual unloading system.

Figure 9:
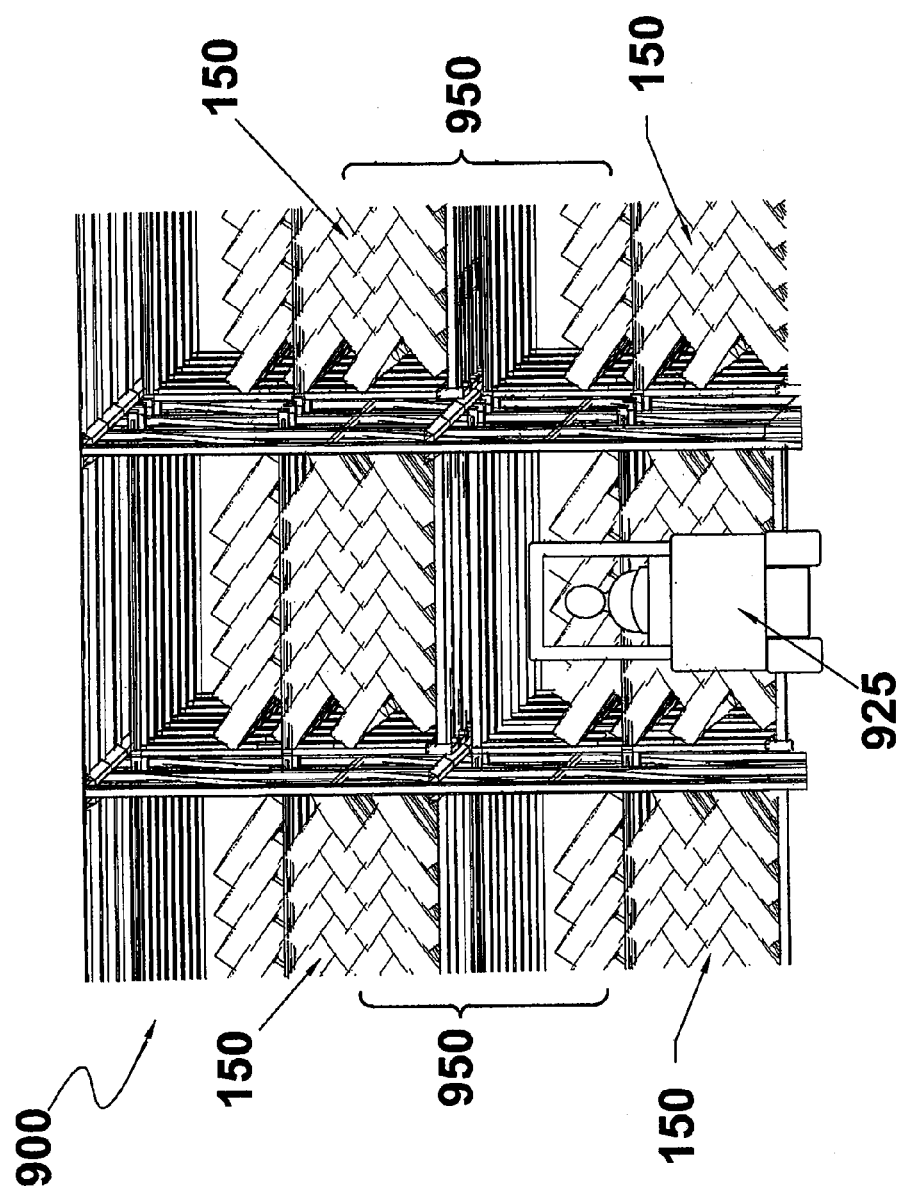
FIG. 9 shows exemplary tire racks configured for drive-in loading, unloading and/or storage in accordance with an embodiment of the present invention.

For example, with reference to one embodiment depicted in FIG. 9, tire racks 100 are configured for drive-in loading, unloading and/or storage. That is, forklift truck 925 is used to unload racks 100 and/or move filled racks 100 directly into a drive-in storage location 900. Racks 100 are stacked 950 to maximize storage within a warehouse, rail car, etc. For example, racks 100 are provided in a variety of sizes to make full use of the space available in the storage and/or transportation vessel for which tire racks 100 are intended. In one embodiment, drive-in storage system 900 is configured such that each tire SKU is stored in two side-by-side locations to guarantee that tire inventory is rotated on a regular basis, for example, every week.

Drive-in storage 900 is also configured with one or more computing systems, such as those described herein, to communicate with other loading and/or unloading systems of the present invention. For example, an unloading system of the present invention may communicate with drive-in storage 900 when a first rack 100, which is being unloaded, is all or partially-empty such that a second rack 100 can be delivered from drive-in storage 900 to the unloader. In another embodiment, an unloader and/or loader communicates with drive-in storage 900 when daily customer orders show that there is additional demand for a specific tire 150 SKU. Rack 100 is then pulled from drive-in-storage 900 using, for example, a pull system applying lean manufacturing principles.

Lean manufacturing principles are applied throughout the invention to facilitate efficiency in tire loading, unloading and/or storage. For example, in one embodiment, value stream mapping is used to analyze logistics data provided by a company to create pareto analysis to identify high volume, high turn-over tire 150 SKUs. A manufacturing plant analysis is implemented to determine the capacity and production rate of a given customer to determine the size, capacity, number, and/or breadth of tire loading, unloading and/or storage needed to fulfill capacity and production goals. For example, for higher customer inventory levels, fully-automated loading, unloading and/or storage systems may be desired. However, for lower inventory levels, customers may use partially-automated loaders, unloaders, and/or storage systems to maximize efficiency and lower overall costs.

In yet another embodiment, the systems and methods of the present invention are facilitated by one or more human and/or computerized operators. For example, an operator monitors robot loaders and/or unloaders, monitors system settings and/or identifies racks that require replacement or repair. Operators also drive forklifts, load/unload tires, and/or the like to facilitate overall system usage.

The system is designed to handle all sizes of passenger tires 150, to provide maximum compression of tires 150, to minimize the manual labor required for loading, unloading or compression and to be used with any standard box car. Further, the system is designed to handle multiple tires 150 at a single time to automatically compress tires 150 and to provide tooling that holds one or two rows of tires 150. The system further enables a forklift to move the compressed tires 150 in the tooling and the tooling is returned by truck or rail.

Tire racks 100 are about 4 feet to about 14 feet tall when filled. In one embodiment, tire rack 100 is around eight feet tall when filled. Tire racks 100 are stacked 950 on top of one another to also facilitate space management in the distribution center, manufacturing plant and/or transportation mechanism. For example, in one embodiment, tire rack 100 is around four feet tall when filled. In yet another embodiment, a first tire rack 100 that is around 4 feet tall is stacked on top of a second rack 100 that is 8 feet tall in order to maximize the interior space of a rail car.

Tires 150 are ricked or stacked in a herringbone pattern to facilitate compression and/or space management. The system and method also includes the stacking of tires 150 in any other suitable arrangement that would allow the transport rack 100 to perform similar functions. Moreover, the system and method includes any variation or angle of herringbone patterns that would allow the transport rack 100 to perform similar functions as disclosed herein.

As one with ordinary skill in the art appreciates, the proper alignment of tires 150 in the herringbone pattern depends upon the geometry of tires 150 being stacked. Thus, the system contemplates and accommodates incorporation of an automated system for control of the loader system. The control system automatically senses tire geometry based on sensors located at an upstream position on the conveyor, or alternatively, accommodates the manual input of information. In both cases, however, the control system uses information that is indicative of tire geometry, such outside diameter, inside diameter, and/or tread width, to determine the rotation and translation of each tire to produce the desired stacking pattern. With respect to herringbone stacking patterns, the relevant output variables include the angle of deviation from vertical associated therewith the axis of rotation of tires 150 in successive rows as well as the number of tires 150 in each row and the number of rows in each stack. Furthermore, the control system determines the appropriate amount of compression to apply to the stacked load, and the corresponding number of rows in the stack, to avoid permanent deformation of tires 150. The control system considers a variety of factors in determining the appropriate compressive loads to apply. In one embodiment, these factors include the material properties and/or hardness of tires 150 (usually rubber), tire geometry and stacked orientation, and the time and temperature environment to which compressed tires 150 will be subjected. In addition, empirical data and experience can be incorporated to optimize the control of the system.

Tires 150 are placed on rack 100 in rows, with tires 150 in each row leaning in one direction. The direction that tires 150 lean alternates between adjacent rows. Tires 150 in each row can be identical having the same SKU (stock keeping unit) number and the same size. Tires 150 in each half of rack 100 can be identical having the same SKU number, the same size, or close enough in size that the same number of tires 150 are included in each row. Different model or size tires 150 can be stacked on the bottom half of a rack than on the top half.

Rack 100 is configured to accommodate tires 150 with diameters ranging anywhere from around 24" to around 48". For example, in one embodiment, rack 100 is configured to hold tires 150 for small cars and/or light trucks. That is, tires 150 that range from about 24" to about 32". In another exemplary embodiment, rack 100 is configured to hold tires 150 for a large trucks and/or semi trailers. That is, tires 150 range from about 32" to about 48".

In one exemplary embodiment, tires 150 are arranged in rows of six if tires 150 are 28" or less in diameter and 9" or less in width. In another embodiment, tires 150 with diameters greater than 28" are arranged in rows of six, five or even fewer tires.

Figure 3:
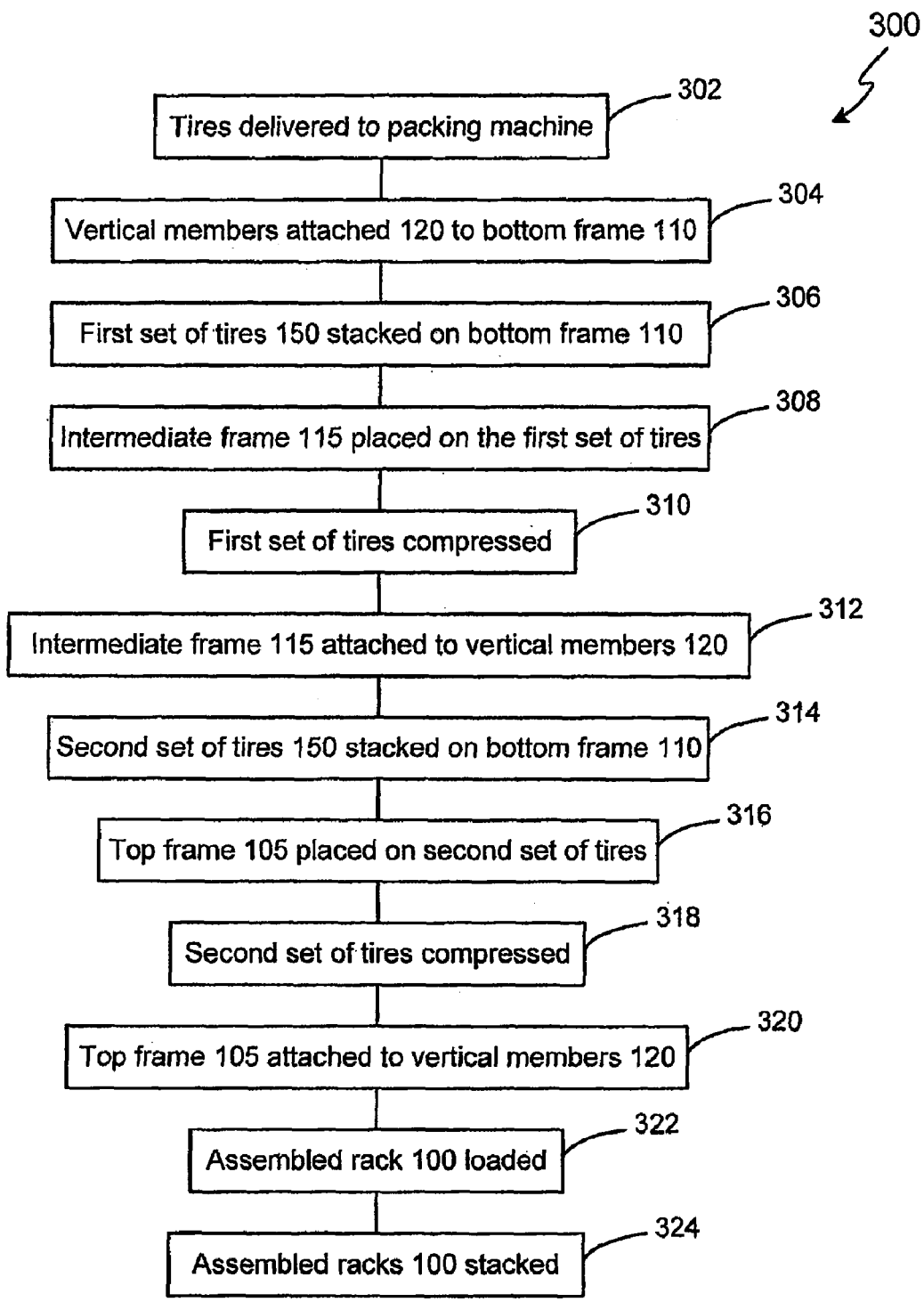
FIG. 3 shows an exemplary method of packing tires for shipment in accordance with an embodiment of the present invention.

The invention also includes a method 300 of packing tires 150 for shipment. Exemplary method 300 is illustrated in FIG. 3 and includes in any order at least the following steps. That is, tires 150 are first delivered to a packing machine (step 302). Tires 150 are automatically delivered, for example, using a conveyor, robotics, a forklift and/or any other automatic device (described in more detail herein). Tires 150 are also manually delivered, for example, using workers, etc. Tires 150 are also delivered using both automatic and manual delivery means. For example, workers load tires 150 onto a conveyor, which in turn automatically delivers the tires to a packing machine (described in more detail herein).

Next, rack 100 is partially constructed by attaching at least four vertical members 120 to bottom frame 110 (step 304). Rack 100 is partially constructed automatically and/or manually using any attaching mechanism 130 described herein. Once vertical members 120 are attached to bottom frame 110, a first set of tires 150 is stacked on bottom frame 110 (step 306). In one exemplary embodiment, the packing machine is used to stack the first set of tires. In another exemplary embodiment, stacking is performed manually and/or using automation. After the first set of tires is stacked, intermediate frame 115 is placed on the first set of tires 150 (step 308). Intermediate frame 115 is placed automatically and/or manually. For example, in one embodiment, a forklift is used to place intermediate frame 115. Next, the first set of tires 150 is compressed in a vertical direction by moving at least one of bottom frame 110 and intermediate frame 115 (step 310). Compression facilitates space management and efficiency.

A compressor accomplishes the compression of the entire stack of tires 150 by translating the upper retainer and the lower retainer of a tire transport frame relative to one another to compress a stack of tires 150 located therebetween. Alternative embodiments of the compressor accomplish the compression of tires 150 by translating the stack of tires 150 vertically upward toward a stationary upper retainer (e.g., intermediate frame 115), or by translating an upper retainer (e.g., intermediate frame 115) vertically downward against a stack of tires 150 that is supported by a stationary lower retainer (e.g., bottom frame 110), or by simultaneously translating both the stack of tires 150 in a vertical upward direction and an upper retainer (e.g., intermediate frame 115) vertically downward against the stack of tires 150. The compressor accomplishes the translation of the retainers through use of any of a variety of mechanisms including a scissors lift or any other sort of adjustable height mechanism motivated by hydraulic or pneumatic cylinders, electric motors or pumps, gear systems, pulleys, gears and/or the like.

Intermediate frame 115 is attached to vertical members 120 (step 312). Intermediate frame is attached automatically and/or manually using any attaching mechanism 130 described herein. A second set of tires 150 is then stacked on bottom frame 110 (step 314). The second set of tires 150 is stacked manually and/or automatically. In one exemplary embodiment, a packing machine is used to stack the second set of tires 150. Once the second set of tires is stacked, top frame 105 is placed on the second set of tires 150 (step 316). The second set of tires 150 is then compressed (step 318) in a vertical direction by moving at least one of bottom frame 110, intermediate frame 115, and/or top frame 105. After the second set of tires 150 is compressed, top frame 105 is attached to vertical members 120 in order to form an assembled rack 100 loaded with tires 150 (step 320). Top frame 105 is attached to vertical members 120 automatically and/or manually using any attachment mechanism 130 described herein. Once rack 100 is loaded and assembled, rack 100 of tires 150 is moved into or onto at least one of a truck, a railroad car, a shipping container, a trailer, and/or a ship (step 322).

Other embodiments can be similar, except that vertical members 120 in two parts as described herein, are already attached to top 105 and bottom 110 frames, and/or fit together near the middle in a telescoping arrangement. The method further includes the step of stacking assembled racks of tires 150, for example, on railroad cars (step 324). In some embodiments, the first set of tires 150 and the second set of tires 150 are compressed substantially equally. The first set of tires 150 and the second set of tires 150 contain substantially equal numbers of tires 150 especially if tires 150 on the top and bottom are the same or the same size. On the other hand, the numbers of tires 150 on the top and bottom can be unequal, particularly if the size of tires 150 on the top and bottom are not the same. In one embodiment, each row of rack 100 is loaded with a specific SKU of tires 150, thereby allowing each rack 100 to hold two different SKUs of tires 150. In another embodiment, each entire rack 100 holds one SKU of tires 150.

In one embodiment, the method further includes the step of disassembling a returned rack 100. The returned rack 100 is disassembled for return shipment in a manner that substantially reduces the volume of rack 100 in comparison with the volume of an assembled rack loaded with tires 150. In one embodiment, the weight of tire rack 100 is minimized in order to maximize the payload capacity of tire rack 100 within the storage and/or transportation vessel. Further, to facilitate the return of top frame 105, intermediate frame 115, and/or bottom frame 110 of tire rack 100 to the origin of tires 150 for future use, racks 100 are constructed to be interchangeable and to nest when they are stacked. Collapsible racks 100 are described in greater detail herein.

The present invention also includes a system for loading, sorting and/or unloading tires 150 and for compressing tires 150 within a tire transport frame. The system is automated and/or computer controlled. The system is used in a plant that manufactures tires 150, and sorts and stores tires 150 coming off the assembly line, and then dispenses tires 150 in a desired order for shipment. Tires 150 exit a manufacturing plant or assembly line in an order other than what is necessary or desirable for loading tires 150 onto shipping racks or storing tires 150 in a warehouse. This system of sorting and storing tires 150 solves or reduces the severity of this problem or other similar problems involving the distribution of tires 150.

Figure 4:
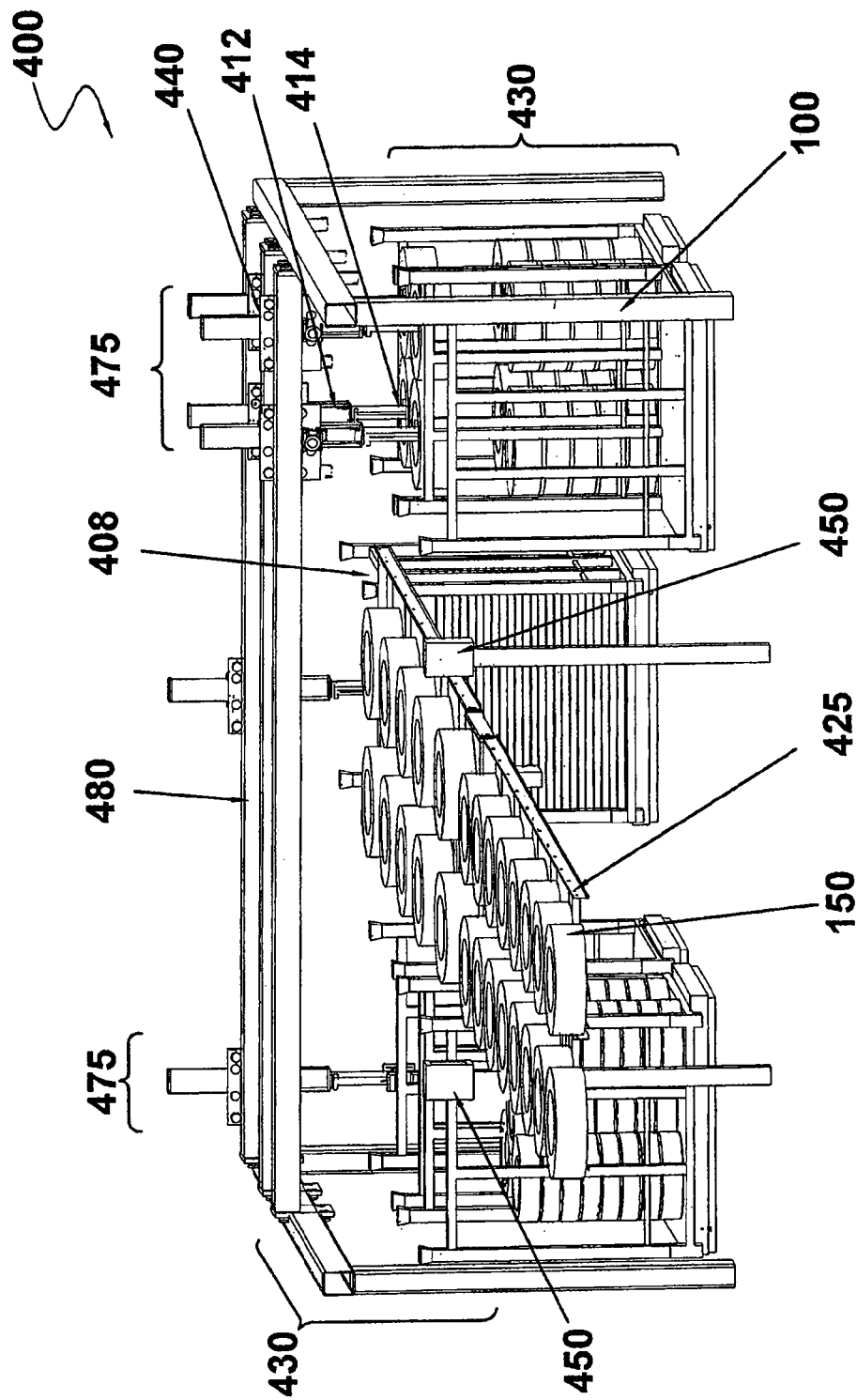
FIG. 4 shows an exemplary conveyor system for automatically loading and/or sorting tires in accordance with an embodiment of the present invention.

In another exemplary embodiment, a conveyor system automatically loads and/or sorts tires 150 into racks 100 for storage. As illustrated in FIG. 4, exemplary conveyor system 400 comprises a conveyor 425 configured to move tires 150 into a rack loading system 475 located adjacent to a stop position 408 at the end of conveyor 425. Conveyor 425 is about seven feet above the floor. However, conveyor 425 can also be configured for any other height desired for that particular application. Conveyor 425 is configured to automatically move tires in one or more split lanes into a warehouse rack loading system 475. For example, as depicted in exemplary FIG. 4, conveyor 425 is configured to move tires in two split lanes. Conveyor 425 is configured with a conveyor belt, roller bars, and/or any other mechanism for moving tires 150.

Each rack loading system 475 is configured to act independently from one another. For example, one rack loading system 475 performs the loading process while a second rack loading system 475 performs a compression process. While rack loading system 475 facilitates both the loading of racks 100 and/or warehouse racks and compression of tires, rack loading system 475 is configured to facilitate one and/or both functions at any time. As used herein, warehouse racks include any type of rack that is distinct from racks 100, including for example, pallets, racks such as those manufactured by Ohio Rack, Inc., or the like.

In one exemplary embodiment, the loading process includes transporting tires 150 on a conveyor 425 to a pick-and-place location where a plurality of gantry robots 440, typically numbering between three and six, perform a series of operations to rotate and translate tires 150 into the proper orientation, along with positioning tires 150 and stacking tires 150. These rotation and translation operations typically include seizing tires 150, rotating tires 150, placing tires 150 together, moving the set of tires 150 to interleave position, and/or placing the set of tires 150 in interleaving fashion atop the previously stacked tires 150, or, if none have been stacked, atop each rack 100 and/or warehouse rack.

Conveyor system 400 comprises one or more scanners 450 to facilitate identifying each tire 150. For example, in one embodiment, system 400 comprises two scanners 450 configured on both sides of two-lane conveyor 425. Scanners 450 are configured both above and below conveyor 425 and/or tires 150 to facilitate reading the labels/SKUs of tires 150. In alternate embodiments, scanner 450 may be a barcode scanner, a radio-frequency scanner, optical scanners, vision systems and/or any other type of scanner for reading and/or identifying tire 150 labels and/or SKUs. Scanner 450 is configured with a CPU and/or any other computing system or unit. Scanner 450 is also configured to communicate with rack loading system 475, conveyor 425 and/or any other part of system 400 or any other system described herein.

In one embodiment, each tire on racks 100 and/or a warehouse rack is the same type, size, and/or SKU number, or is designated for the same destination or shipping rack. Tires 150 are delivered to racks 100 and/or a warehouse rack on conveyor 425.

Scanner 450 computing unit and/or any other computing unit used or described herein may be connected with each other via a data communication network. The network may be a public network and assumed to be insecure and open to eavesdroppers. In the illustrated implementation, the network is embodied as the Internet. In this context, the computers may or may not be connected to the Internet at all times. For example, the customer computer may employ a modem to occasionally connect to the Internet, whereas the bank computing center might maintain a permanent connection to the Internet. Specific information related to the protocols, standards, and application software utilized in connection with the Internet may not be discussed herein. For further information regarding such details, see, for example, Dilip Naik, "Internet Standards and Protocols" (1998); "Java 2 Complete," various authors (Sybex 1999); Deborah Ray and Eric Ray, "Hosting HTML 4.0" (1997); Loshin, "TCP/IP Clearly Explained" (1997). All of these texts are hereby incorporated by reference.

It may be appreciated that many applications of the present invention could be formulated. One skilled in the art may appreciate that a network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like. Moreover, although the invention is frequently described herein as being implemented with TCP/IP communications protocols, it may be readily understood that the invention could also be implemented using IPX, Appletalk, IP-6, NetBIOS, OSI or any number of existing or future protocols. Moreover, the present invention contemplates the use, sale or distribution of any goods, services or information over any network having similar functionality described herein.

In accordance with various embodiments of the invention, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Interbase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and/or the like.

A system user may interact with the system via any input device such as, a keypad, keyboard, mouse, kiosk, personal digital assistant, handheld computer (e.g., Palm Pilot®, Blackberry®), cellular phone and/or the like. Similarly, the invention could be used in conjunction with any type of personal computer, network computer, work station, minicomputer, mainframe, or the like running any operating system such as any version of Windows, Windows XP, Windows NT, Windows 2000, Windows 98, Windows 95, MacOS, OS/2, BeOS, Linux, UNIX, Solaris, MVS or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates the use, sale, or distribution of any goods, services or information over any network having similar functionality described herein.

In one embodiment, conveyor 425 is configured to communicate with scanner 450 and to rotate tires to facilitate orienting the labels on tires 150. In another embodiment, scanner 450 is configured to spin and/or rotate tires 150 to orient the tire labels.

Rack loading system 475 is also configured to stack tires 150 based upon identification information received from scanner 450. For example, in one embodiment, rack loading system 475 is configured to receive tire 150 identification information from scanner 450 and to use tire 150 identification information to determine what tire stacking configuration to use. That is, for smaller diameter tires, rack loading system 475 stacks tires 150 in layers of five tires 150. For larger diameter tires, rack loading system 475 stacks tires 150 in layers of four tires 150.

Tires 150 are placed on racks 100 and/or a warehouse rack so that the labels on tires 150 are clearly visible from the outside of racks 100 and/or the warehouse rack. A scissor lift, described herein, maintains the top level of tires 150 consistent as racks 100 and/or the warehouse racks are loaded. Gantry robots (e.g., pick-and-place robots and/or free-standing robots) are used to facilitate unloading of conveyor 425 and/or loading and/or unloading of racks 100 and/or the warehouse racks.

System 400 comprises any number of robots 440, racks 100 and/or warehouse racks. In one embodiment, exemplary rack loading system 475 is configured with one to three pairs of robots 440 on each side, for a total of up to six robots 440. While rack loading system 475 is configured to use robots 440 to pick-up up to six tires 150 at once off of conveyor 425, rack loading system 475 is configured to pick up fewer than six tires 150 at once during normal use. Conveyor system 400 also comprises up to four load stations 430 to receive tires 150 as they are sorted by loading system 475. Each load station 430 comprises at least one rack 100 for storing tires 150. However, in some embodiments, each load station 430 comprises up to four racks 100 and/or warehouse racks. Rack loading system 475 is also configured with one or more rails 480 to facilitate holding robots 440 and/or to facilitate moving robots 440 laterally to service each load station 430.

In addition to the rack 100 and/or warehouse rack sorter/loader, the present invention includes a loader/unloader system. Tire loader/unloader system 500, as illustrated in exemplary FIG. 5, includes a conveyor 525 that presents tires 150 to the pick-and-place loaders 510 of the automatic tire loading and unloading system 500. While system 500 is configured for both unloading and loading of tires, it will be described here in a loading context. However, it should be noted that while tire loader/unloader system 500 uses the same devices for both loading and unloading, the order of operation and/or direction that the devices work in system 500 may vary depending on whether system 500 is being used for loading or unloading.

In alternative embodiments, the tires exist in a suitable location and arrangement without the need for a conveyor. Conveyor 525 elevates tires 150 to a stop position in front of one or more position pick-and-place loaders 510. Pick-and-place loaders 510 each comprise a support-mounted actuator system 512, each of which controls an extendable/retractable arm 514 that is adapted to seize tire 150 from conveyor 525. Each of extendable/retractable arms 514 includes a first end rotatably attached to actuator system 512 and a second end having a tire seizer 520. The extendable functionality of each extendable/retractable arm 514 is provided by a variety of mechanisms including a scissoring a plurality of hinged members, a telescoping plurality of concentric cylinders or a member adapted to slide along a guide or set of guides. Tire seizer 520 is any device adapted for seizing a tire including, for example, a plurality of members adapted to clamp the bead of the inner and/or outer diameter of a tire or a plurality of members adapted to compress a tire from its inner diameter or tread in the direction of the tire's radial direction. Tire seizer 520 is also configured to seize a tire from its outer diameter by compressing the sidewalls of the tire in the direction of the tire's axis of rotation.

Initially, the extendable/retractable arms 514 of pick-and-place loaders 510 are retracted to allow tires 150 to be moved by conveyor 525 to positions proximate to tire seizer 520. Once the tires have been transported into a position that facilitates their being seized, extendable/retractable arms 514 are extended to positions suitable for seizing tires 150. These positions are set by the adjustment of a mechanical position stop or by the position of an actuator that is adapted to respond to a signal from a control system that itself is configured to accommodate inputs sufficient to identify tire geometry and produce an appropriately responsive position command. Once tire seizer 520 is in the proper location, it seizes the tires, and the extendable/retractable arms 514 are retracted to remove tires 150 from conveyor 525.

Having seized tires 150, extendable/retractable arms 514, and therefore tires 150, are rotated. The rotated tires 150 are translated and articulated to place the plurality of tires 150 into alignment with one another as well as in complementary alignment with the tires in rack 100. Extendable/retractable arms 514 then rotate and elongate to place the plurality of tires together, and then place the plurality of tires into rack 100 to propagate the herringbone pattern of the stack of tires.

In one embodiment, loading system 500 comprises a plurality of pick-and-place loaders 510, that can pick and place one to six tires 150 depending on the width of the tires 150 be stacked and the width of rack 100 on which tires 150 are to be placed. Pick-and-place loaders 510 comprise one or more scanners 450 that are configured as cameras, motion sensors, or the like. Scanners 450 are used to communicate information about tire 150 locations to pick-and-place loaders 510. For example, in unloading systems 500, tires 150 in racks 100 are likely to move around during the unloading process. Scanners 450 can obtain information about tires 150 locations so that tires 150 can be properly picked out of rack 100 by pick-and-place loaders 510.

Figure 5:
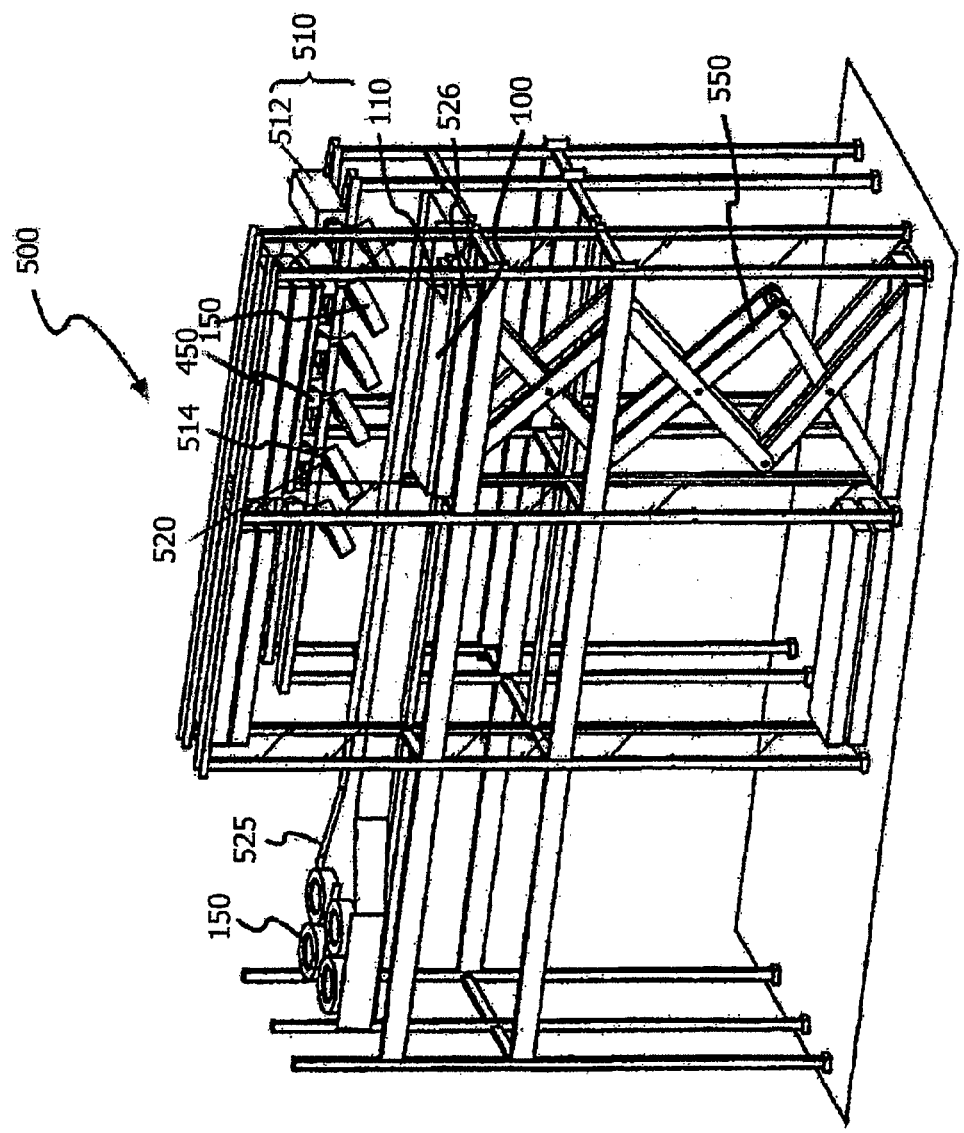
FIG. 5 shows an exemplary loader/unloader system in accordance with an embodiment of the present invention.

In the loading context, the motions to grasp and place tires 150 in a herringbone pattern include each pick-and-place loader 510 moving relative to each other. Loading system 500 places tires 150 on bottom frame 110 that is located on an elevated table 526 that is raised and lowered in relation to pick-and-place loaders 510 to permit additional rows to be added to rack 100. The raising and lowering of elevated table 526 may be accomplished by a variety of mechanisms including, as shown in FIG. 5, a scissors mechanism 550. Tires 150 are stacked on top of each other in rows the width of rack 100. For more information on tire loading/unloading systems, see U.S. Pat. No. 6,527,499 (Leimbach et al.), previously incorporated herein by reference in its entirety.

Figure 6A:
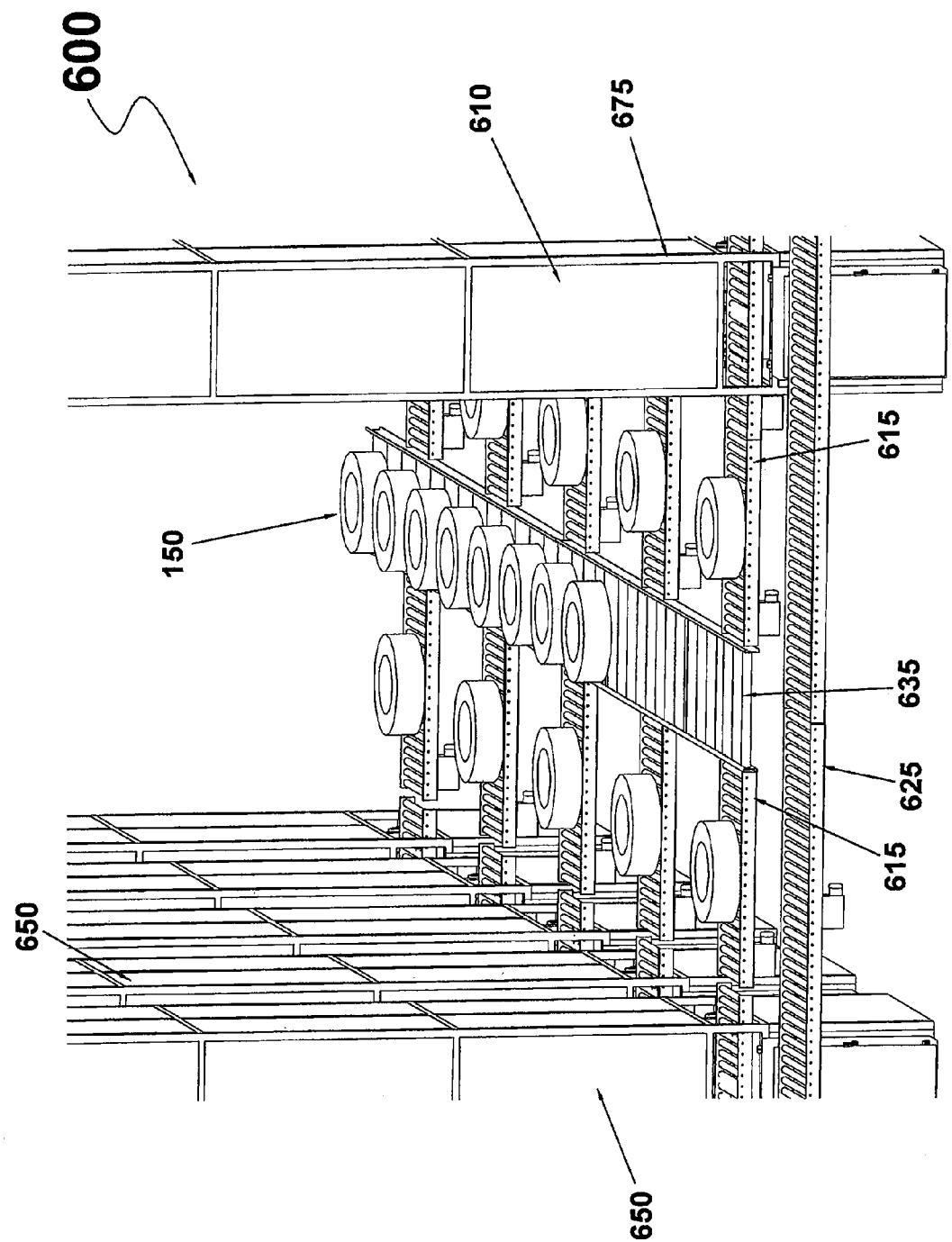
FIGS. 6A-B show an exemplary tower system for sorting and/or storing tires in accordance with an embodiment of the present invention.
Figure 6B:
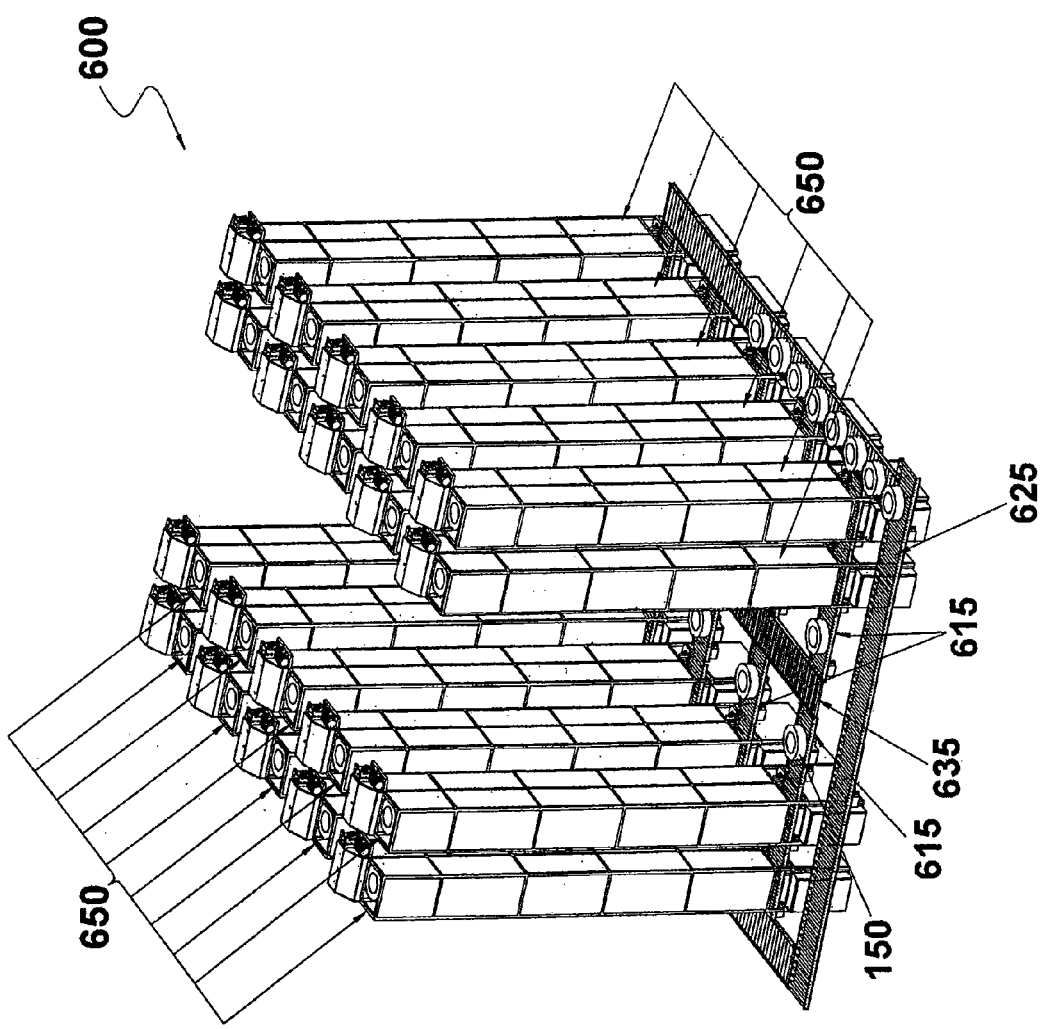

In yet another exemplary embodiment, the present invention includes one or more tower loading/unloading systems configured to facilitate storing, unloading and queuing tires. For example, with reference to an exemplary tower system depicted in FIGS. 6A and 6B, tower system 600 comprises one or more towers 675 for sorting and/or storing tires 150. Towers 675 are unloaded and/or loaded via one or more conveyors 625, 615, 635. Conveyors 625, 615, 635 are configured in a manner similar to other conveyors (i.e., conveyor 425, etc.) described herein. Conveyors 625, 615, 635 move tires 150 from racks 100 to towers 675, from towers 675 to conveyor system 400, and/or to or from towers 675 to any other system or location described herein.

Figure 7:
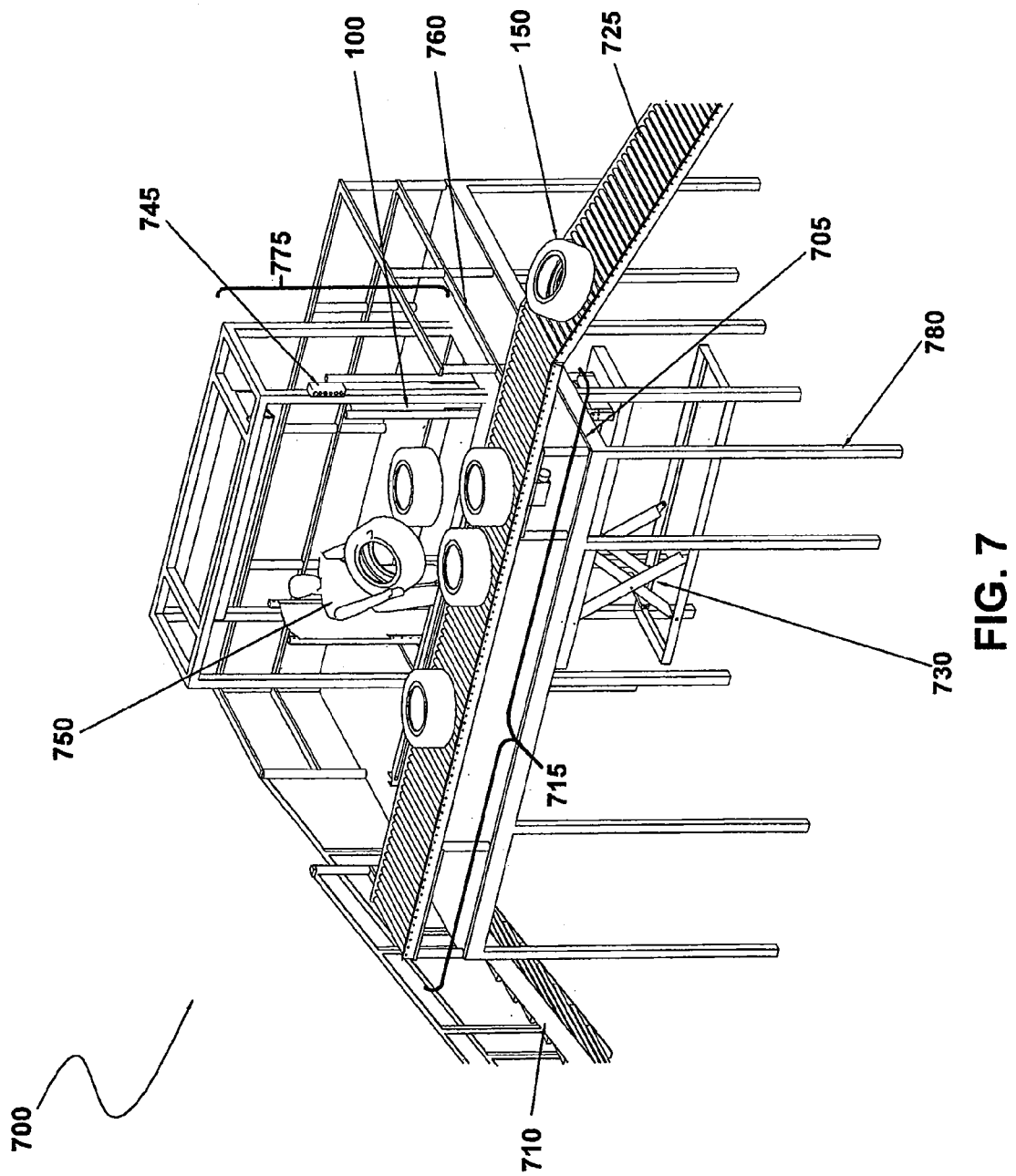
FIG. 7 shows an exemplary partially automated system for unloading/loading tires in accordance with an embodiment of the present invention.

For example, in one embodiment, loaded racks 100 are set into a queue that feeds into system 600. Racks 100 are raised up to robotic devices by scissor lifts (also to be placed to an unloading conveyor 625 (for example, scissor mechanism 550 of FIG. 5). Alternatively, tires 150 queue into system 600 from a loading/unloading system such as that described in FIG. 7 (described in detail herein).

System 600 is configured to sort and queue tires horizontally. For example, system 600 comprises one or more tire transportation devices, such as, access conveyors 635 that connect to one or more sub-conveyors 615. Access conveyor 635 moves tires 150 from the main unloading conveyor 625 to various sub-conveyors 615. Sub-conveyors 615, in turn, move tires 150 to/from towers 675. Conveyors 615, 625, 635 are configured to be computer-controlled devices to facilitate sorting, queuing and/or routing of tires 150. For example, in one embodiment, tires 150 are loaded randomly and scanners 650 are used to sort, queue and/or route tires 150 when they are unloaded from towers 675.

In another embodiment, conveyors 615, 625, 635 are configured with one or more scanners 650 to obtain tire 150 identifying information to facilitate sorting and queuing tires 150. Scanners 650 are configured like scanners 450 and communicate with conveyors 615, 625, 635 to facilitate directing each SKU of tire 150 to a different sub-conveyor 615 for loading into a particular tower 675. Each tower 675 is configured to hold between 10 and 30 tires 150 of a single SKU.

Each tower 675 is configured with one or more fingers 610 to support each tire. These fingers 610 are supported by chains and/or other supporting mechanisms. Fingers 610 are configured to travel up the other side of tower 675 in a collapsed state as tires 150 are unloaded from tower 675.

Scanners 650 are further configured with a computer to facilitate inputting tire 150 identifying information, controlling and/or communicating with the computer-controlled conveyors 615, 625, 635. For example, scanners 650 input, control and/or communicate tire size, location, brand, and/or SKU information to facilitate sorting tires 150.

In yet another embodiment, towers 675 are configured with one or more fingers 610. Fingers 610 are supported by chains and/or other supporting mechanisms. Fingers 610 are configured to travel up the other side of each tower 675 using an electric motor. That is, fingers 610 are attached to a tension member that is moved by an electric motor operating through a speed-reduction system. This tension member is configured with a chain to facilitate movement of fingers 610 along towers 675. The speed-reduction system includes a gearbox to facilitate control of the speed of fingers 610.

In yet another embodiment, a system for unloading/loading tires is configured for partially automated operation. For example, with respect to one embodiment depicted in FIG. 7, system 700 is configured as a workstation with both manual and automated components. System 700 includes a loading platform 705, a conveyor 725, a load station 775, and a scissor mechanism 730 for raising racks 100 to platform 705.

Platform 705 includes any substantially level apparatus for a worker 750 to stand on to access both racks 100 and conveyor 725. Platform 705 is configured in any format or shape to provide access to both rack 100 and conveyor 725. For example, in exemplary FIG. 7, platform 705 is configured with a hollowed opening within the center of the platform to provide access for scissor mechanism 730.

Platform 705 is configured to be accessible by workers 750 by way of entry way 710. Entry way 710 is any type of stairway, ladder, ramp, elevator, lift, and/or other mechanism for providing workers 750 access to platform 705. Platform 705 and/or entryway 710 are configured with one or more safety rails 760. Safety rails 760 include any type of rail, wall and/or similar object to provide a barricade between the edge of platform 705 and workers 750. Platform 705 and/or rails 760 are comprised of any rigid and/or semi-rigid material, such as, for example, the materials described herein.

Conveyor 725 is configured with a conveyor belt, roller bars, and/or any other mechanism for moving tires 150. Conveyor 725 is configured to be located at any height above platform 705 to facilitate access by worker 750. In one embodiment, conveyor 725 is configured about three feet above platform 705. Conveyor 725 is configured to automatically move tires in one or more directions. For example, in one embodiment, conveyor 725 is configured to move tires 150 from a placement station 715 to any desired location, such as, for example, a tire loading system, a tire unloading system, a forklift, a railcar, and/or a tire rack. In another embodiment, conveyor 725 is configured to move tires 150 to/from a location such as, for example, a tire unloading system, a forklift, a railcar, a tire rack, a tire storage location or the like to/from placement station 715 for manual loading of tires 150 into rack 100 in tire load station 775.

In yet another embodiment, conveyor 725 is configured as a pallet, warehouse rack, rack 100 and/or other tire 150 holding and/or transporting device. Conveyor 725 is also configured to lie directly on top of platform 705.

Load station 775 is configured within the open portion of platform 705 to house scissor mechanism 730 as it raises and/or lowers rack 100 to platform 705. Load station 775 comprises one or more vertical and/or horizontal members configured to prevent or restrict rack 100 and/or tires 150 from moving outside of load station 775.

Scissor mechanism 730 is configured as any type of lift, elevator, or other mechanism to facilitate raising and/or lowering racks 100. For example, in one embodiment, scissor mechanism 730 is configured to raise racks 100 up to platform 705 and/or down to the ground 780. In one embodiment, scissor mechanism 730 is configured with an actuator and/or other apparatus that facilitate raising and/or lowering rack 100 based upon the weight of rack 100. That is, as tires 150 are unloaded from rack 100, scissor mechanism 730 raises rack 100 higher to facilitate access to the lower tires on rack 100.

System 700 is also configured with a control panel 745 to facilitate worker 750 operation of scissor mechanism 730. For example, worker 750 uses panel 745 to raise and/or lower scissor mechanism 730 in order to facilitate access to tires 150 and/or rack 100. In another embodiment, load station 775 is configured with one or more scanners or cameras to detect the height of rack 100, tires 150 and/or scissor mechanism 730 and raise and/or lower scissor mechanism 730 based on whether the height of rack 100, tires 150 and/or scissor mechanism 730 meets a predetermined height.

Figure 2C:
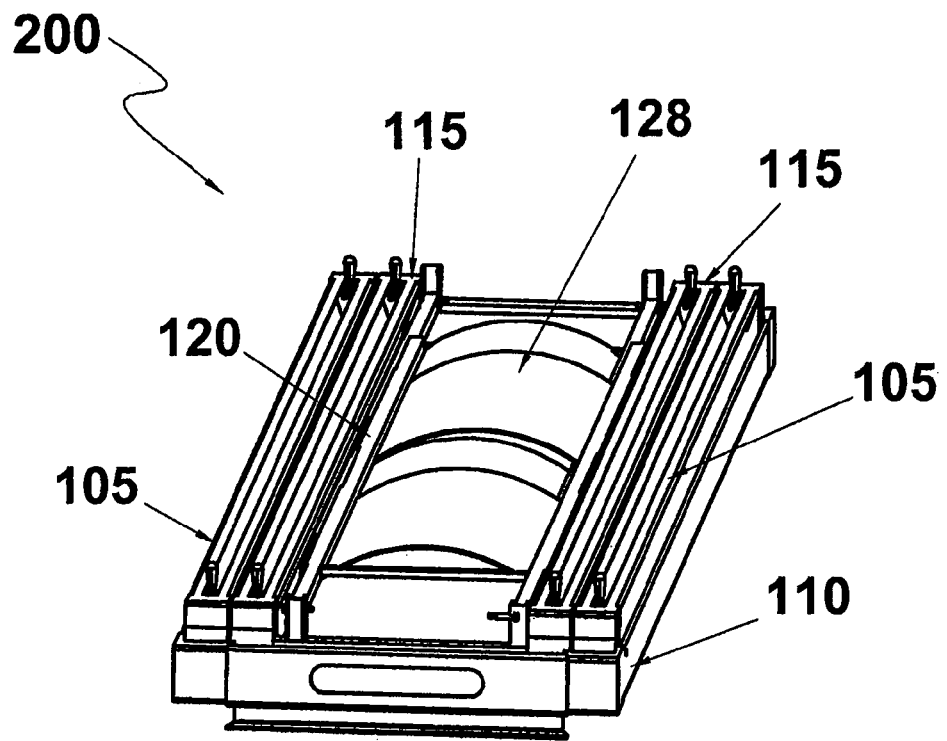
Figure 8:
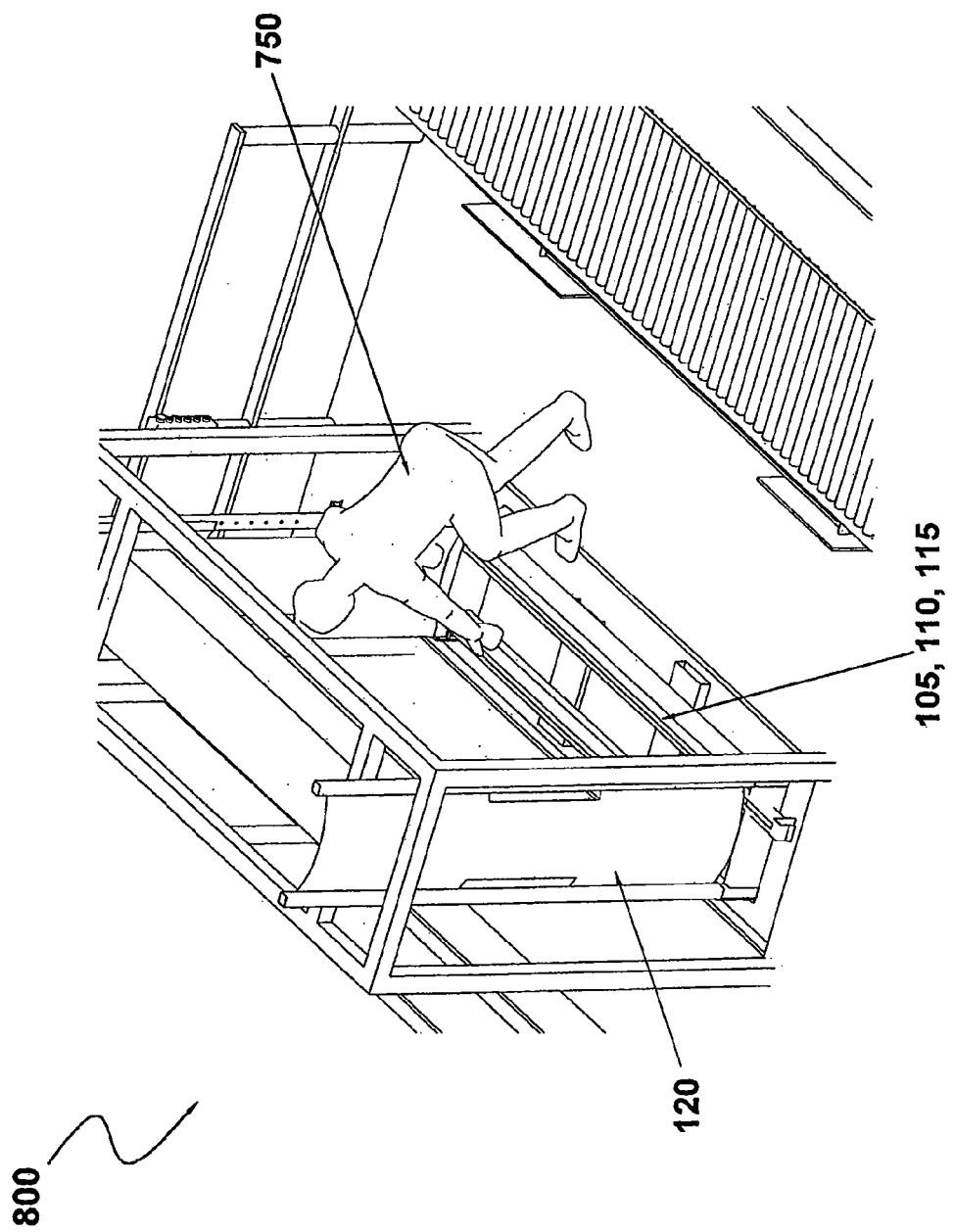
FIG. 8 shows an exemplary empty rack that is disassembled manually for return shipment in accordance with an embodiment of the present invention.

After rack 100 is unloaded using system 700, empty rack 100 can be disassembled for return shipment. For example, with reference to an exemplary embodiment depicted in FIG. 8, worker 750 collapses top frame 105 and/or intermediate frame 115 onto bottom frame 110 parallel to each other and/or in direct contact with each other. Additionally, worker 750 can collapse vertical members 120 substantially parallel to top frame 105, bottom frame, and/or intermediate frame such that rack 100 is collapsed similar to exemplary rack depicted in FIGS. 2A-C.

Figure 10A:
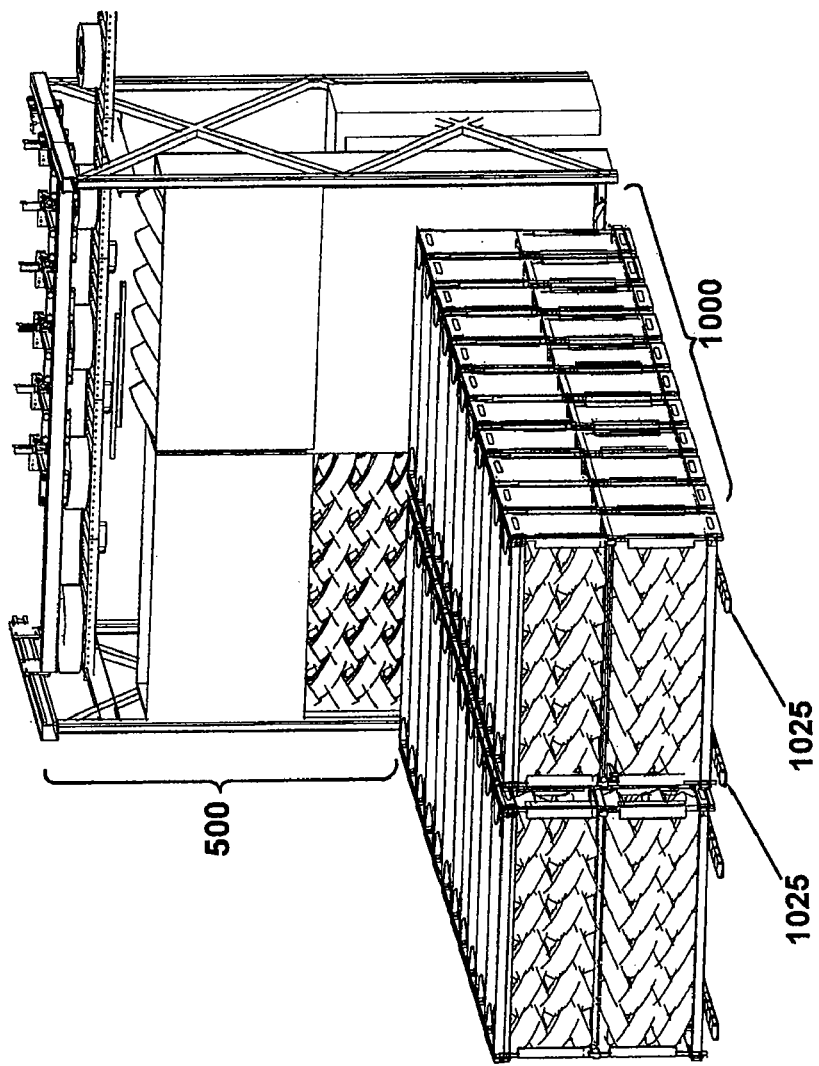
FIGS. 10A-B show an exemplary queuing system in accordance with an embodiment of the present invention.
Figure 10B:
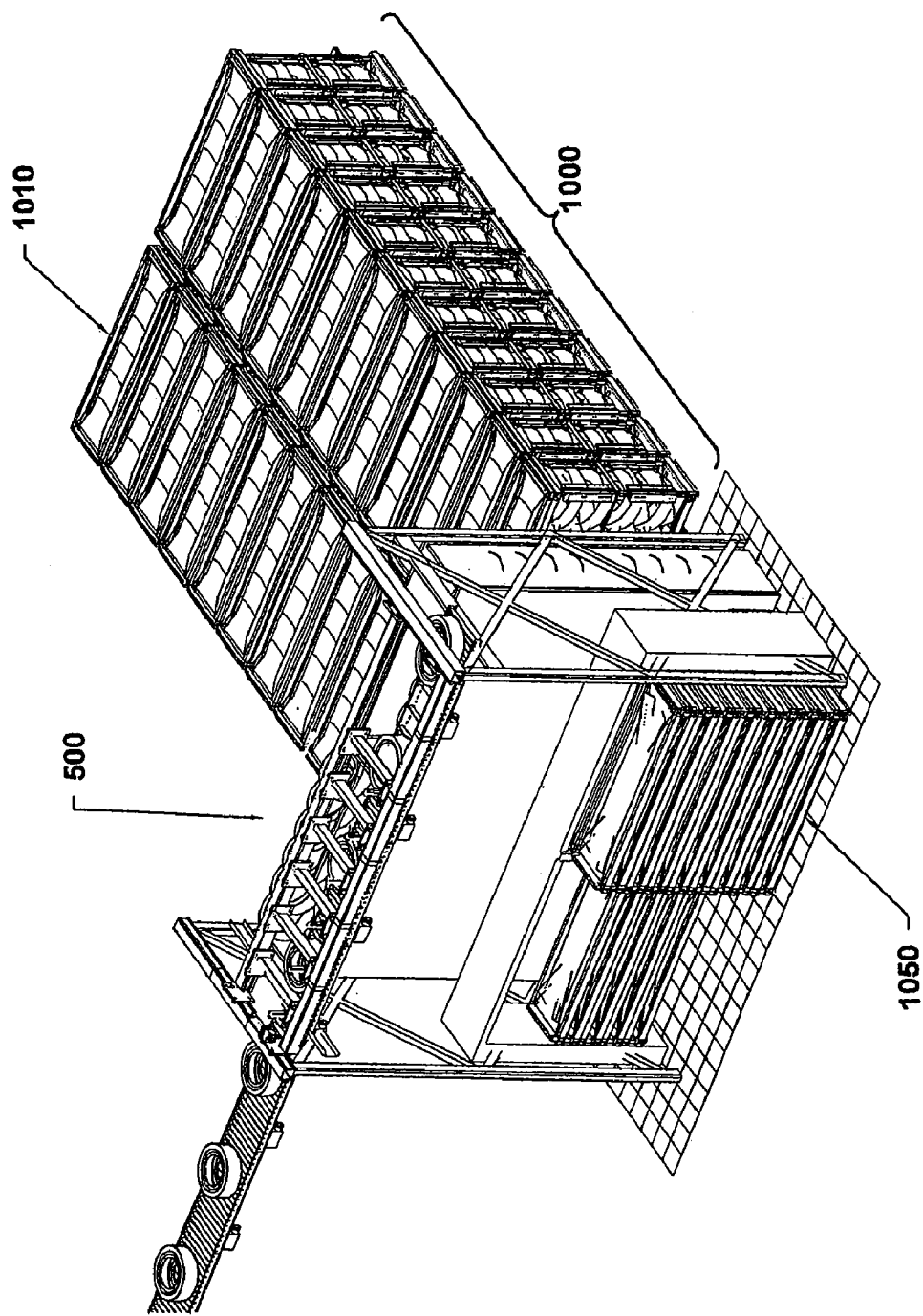

In yet another exemplary embodiment of the present invention, as illustrated in exemplary FIGS. 10A and 10B, a queuing system 1000 is provided. Queuing system 1000 is configured to advance racks 100 from a forklift and/or trailer into an unloading system such as, for example, unloading system 500. Queuing system 1000 is configured to handle any number of racks 100, including, for example, a full trailer-load of racks 100. Queuing system 1000 is used to keep drivers of forklifts, trailers, etc., in their vehicles to speed up the unloading of racks 100 into unloader systems.

Queuing system 1000 comprises an inbound queue of full racks 100 that have been unloaded from a trailer, railcar, forklift and/or other transportation mechanism. For example, eleven full racks 100 are queued on each side 1010 of queuing system 1000.

Without queuing system 1000, each individual rack 100 takes two to three minutes in loading/unloading system 500 to unload tires 150. With 22 full racks 100, this process can take around 44 minutes to 66 minutes per trailer. Using queuing system 1000 to queue full racks 100 and feed into system 500, this process can be shortened.

Queuing system 1000 is configured to hold racks 100 as they are fed into an unloading system. Queuing system 1000 is additionally configured as a buffer queue to feed racks 100 into the unloading system. In one embodiment, to facilitate feeding racks 100 into unloading system 500, queuing system 1000 is configured with one or more rack conveyors 1025 (with reference to FIG. 10A). Rack conveyors 1025 are configured similar to other conveyors described herein. Rack conveyors 1025 hold the weight of multiple racks 100 and move racks 100 from a trailer, forklift or other location to unloading system 500. For example, rack conveyors 1025 move racks 100 to scissor mechanism 550 (not pictured) for tire unloading.

In another embodiment, queuing system 1000 is configured with one or more forklifts to facilitate moving racks 100 from a trailer or other transportation mechanism to loader/unloader system 500. The forklifts additionally are used to move stacked racks 1050 from loader/unloader system 500 back to the trailer or other transportation mechanism. The forklift system allows the trailer driver keep his trailer hitched to the same tractor during the unloading of racks 100 and loading of stacked racks 1050, for overall efficiency in the distribution process.

Once tires 150 are unloaded from racks 100, the emptied racks are collapsed and stacked 1050 by unloading machine 500 (FIG. 10B). These stacked racks 1050 are then loaded onto a trailer, forklift, and/or other transportation mechanism for delivery to a distribution plant, manufacturing plant, customer, and/or the like.

Figure 11A:
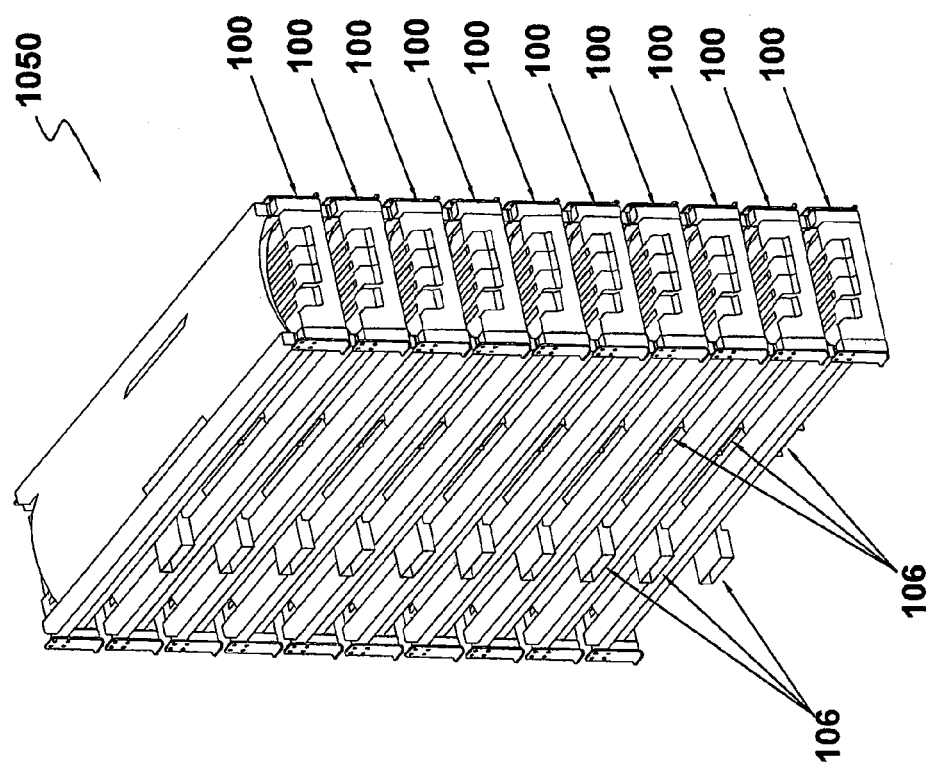
FIGS. 11A-B show an exemplary illustration of stacked racks in accordance with an embodiment of the present invention.
Figure 11B:
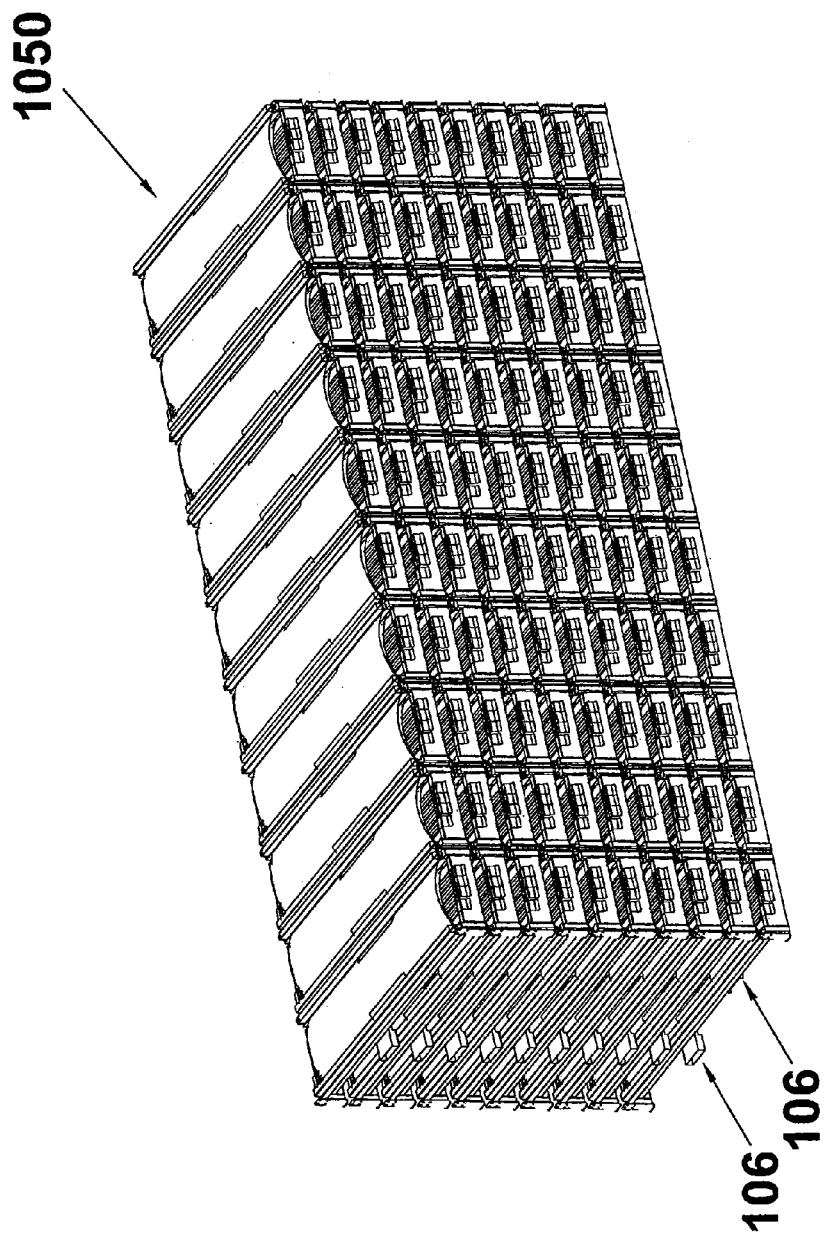

Stacked racks 1050 are further illustrated in exemplary FIGS. 11A and 11B. Stacked racks 1050 are configured with two or more racks 100 that have been collapsed. Each rack 100 in stacked racks 1050 is configured to nest atop the next rack 100 so that the entire stack of racks in 1050 is substantially stable (FIG. 11A). If slots 106 of racks 100 are offset, stacked racks 1050 are aligned adjacent to one another (FIG. 11B) such that each offset slot 106 that protrudes coincides with the side of an offset slot 106 that does not protrude. Stacked racks 1050 contain any number of racks 100 and are stacked adjacent any number of other stacked racks 1050.

It should be understood that the detailed description and specific examples, while indicating exemplary embodiments of the present invention, are given for the purposes of illustration only, and not of limitation. Many changes and modifications within the scope of the instant invention can be made without departing from the spirit thereof, and the invention includes all such modifications. The corresponding structures, materials, acts, and equivalents of all elements in the claims below are intended to include any structure, material, or acts for performing the functions in combination with other claimed elements as specifically claimed. The scope of the invention should be determined by the appended claims and their legal equivalents, rather than by the examples given above. For example the steps recited in any method claims can be executed in any order and are not limited to the order presented in the claims or drawings. Moreover, no element is essential to the practice of the invention unless specifically described herein as "critical" or "essential."

What is claimed is:

1. A rack for holding tires, said rack comprising:
    a top set of tires and a bottom set of tires;
    a top frame and an intermediate frame configured to compress and prevent permanent deformation of said top set of tires therebetween;
    a bottom frame and said intermediate frame configured to compress and prevent permanent deformation of said bottom set of tires therebetween; and
    a vertical member perpendicularly disposed to a surface on which said bottom frame rests, said vertical member attached to said top frame, said intermediate frame and said bottom frame, wherein said top frame is located above and vertically spaced from said intermediate frame; wherein said rack is configured to be stackable such that said rack is configured to support a weight of a second rack loaded with tires; wherein said vertical member comprises at least one of a concave surface and a plurality of flat surfaces arranged in a concave pattern which contacts said top set of tires and said bottom set of tires in said rack.

2. The rack of claim 1, wherein said bottom frame, said intermediate frame, and said top frame are configured to store in a condensed configuration for return shipment with said vertical member.

3. The rack of claim 2, wherein said vertical member is stored parallel to said bottom frame and said top frame, and wherein said vertical member is stored between said bottom frame and said top frame.

4. The rack of claim 1, wherein said vertical member is configured with an internal member and an external member, said external member being configured to contact said tires.

5. The rack of claim 4, wherein said rack is further configured with an attachment mechanism to facilitate attaching said vertical member to at least one of said bottom frame, said intermediate frame, and said top frame.

6. The rack of claim 5, wherein said bottom frame and said intermediate frame are configured to compress said bottom set of tires, wherein said bottom set of tires is configured as a row of tires and wherein said top frame and said intermediate frame are configured to compress a said top set of tires wherein said top set of tires is configured as a row of tires.

7. The rack of claim 1, wherein said bottom frame and said intermediate frame are configured to compress a bottom set of tires stacked in a herringbone arrangement and wherein said top frame and said intermediate frame are configured to compress said top set of tires, wherein said top set of tires are stacked in a herringbone arrangement.

8. The rack of claim 7, wherein said rack is also configured as a shipping vessel.

9. A rack for holding tires, said rack comprising:
    a top frame and an intermediate frame configured to compress and prevent permanent deformation of a top set of tires therebetween;
    a bottom frame and said intermediate frame configured to compress and prevent permanent deformation of a bottom set of tires therebetween, wherein said bottom frame and said intermediate frame are configured to compress said bottom set of tires, wherein said bottom set of tires is configured as a row of tires and wherein said top frame and said intermediate frame are configured to compress said top set of tires, wherein said top set of tires is configured as a row of tires, and wherein said bottom frame and said intermediate frame are configured to compress a bottom set of tires stacked in a herringbone arrangement and wherein said top frame and said intermediate frame are configured to compress said top set of tires, wherein said top set of tires are stacked in a herringbone arrangement; and a vertical member attached to said top frame, said intermediate frame and said bottom frame, wherein said vertical member is configured with at least one of a concave surface and a plurality of flat surfaces arranged in a concave pattern, and wherein at least one of said concave surface and said plurality of flat surfaces is configured to contact said tires, and wherein said vertical member is stored parallel to said bottom frame and said top frame, and wherein said vertical member is stored between said bottom frame and said top frame, and wherein said vertical member is configured with an internal member and an external member, said external member being configured to contact said tires;

wherein said bottom frame, said intermediate frame, and said top frame are configured to store in a condensed configuration for return shipment with said vertical member, wherein said rack is configured to be stackable and configured to support a weight of another rack loaded with tires, and wherein said rack is further configured with an attachment mechanism to facilitate attaching said vertical member to at least one of said bottom frame, said intermediate frame, and said top frame.

10. The rack of claim 9, wherein said rack is also configured as a shipping vessel.

* * * * *